US011227245B2

(12) United States Patent
Standefer, III et al.

(10) Patent No.: US 11,227,245 B2
(45) Date of Patent: Jan. 18, 2022

(54) MASTER VIEW OF TASKS

(71) Applicant: Microsoft Technology Licensing, LLC, Redmond, WA (US)

(72) Inventors: Robert Standefer, III, Duvall, WA (US); Christopher L. Mullins, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 987 days.

(21) Appl. No.: 15/429,440

(22) Filed: Feb. 10, 2017

(65) Prior Publication Data

US 2018/0196579 A1 Jul. 12, 2018

Related U.S. Application Data

(60) Provisional application No. 62/443,250, filed on Jan. 6, 2017.

(51) Int. Cl.
*G06Q 10/06* (2012.01)
*G06F 8/36* (2018.01)
(Continued)

(52) U.S. Cl.
CPC ....... *G06Q 10/0633* (2013.01); *G06F 3/0482* (2013.01); *G06F 8/36* (2013.01); *G06F 16/9535* (2019.01); *G06Q 10/06311* (2013.01)

(58) Field of Classification Search
CPC .............. G06Q 10/0633; G06Q 10/06; G06Q 10/0631; G06Q 10/06311; G06F 3/0482;
(Continued)

(56) References Cited

U.S. PATENT DOCUMENTS 7,016,855 B2   3/2006 Hayes et al.
7,475,021 B2   1/2009 Wilbrink et al.
(Continued)

FOREIGN PATENT DOCUMENTS

EP   2012261 A1   1/2009
EP   2426888 A2   3/2012

OTHER PUBLICATIONS

Steve Whitaker, Supporting Collaborative Task Management in E-mail, Jun. 1, 2005, Human-Computer Interaction, vol. 20, pp. 49-88. (Year: 2005).*

(Continued)

*Primary Examiner* — Charles Guiliano
*Assistant Examiner* — Letoria G Knight

(57) ABSTRACT

Examples of the present disclosure describe systems and methods of managing user tasks using isolated collections of data. In aspects, input may be received by a task management application/service. The task management application/service may analyze the input to determine isolated collection of resources identifying tasks associated with one or more user accounts. The task management application/service may aggregate and analyze the tasks to determine associations between the tasks, to classify tasks and/or to prioritize tasks. The task management application/service may use the analyzed data to provide notifications, prompt user action and/or provide query results. In aspects, the task management application/service may also provide an interface comprising a single master view of tasks aggregated from disparate data stores and/or user accounts associated with a user.

20 Claims, 16 Drawing Sheets

(51) Int. Cl.
*G06F 3/0482* (2013.01)
*G06F 16/9535* (2019.01)

(58) Field of Classification Search
CPC ... G06F 3/04842; G06F 8/036; G06F 16/9535
See application file for complete search history.

(56) References Cited

U.S. PATENT DOCUMENTS

| | | | |
|---|---|---|---|
| 7,541,940 B2 | 6/2009 | Upton et al. | |
| 7,565,340 B2 | 7/2009 | Herlocker et al. | |
| 8,375,320 B2 | 2/2013 | Kotler et al. | |
| 8,381,088 B2 | 2/2013 | Kikin-gil et al. | |
| 8,417,715 B1 | 4/2013 | Bruckhaus et al. | |
| 8,645,182 B2 | 2/2014 | Johnson et al. | |
| 8,983,501 B2 | 3/2015 | Dishneau et al. | |
| 9,122,542 B1 | 9/2015 | Nelissen | |
| 9,251,268 B2 | 2/2016 | Schechter et al. | |
| 9,299,039 B1 | 3/2016 | Wang | |
| 9,323,423 B1* | 4/2016 | Rosner | G06F 3/0482 |
| 9,646,081 B1 | 5/2017 | Volchegursky et al. | |
| 9,727,376 B1* | 8/2017 | Bills | G06Q 10/0631 |
| 10,229,167 B2* | 3/2019 | Lindsay | G06F 16/337 |
| 10,366,359 B2* | 7/2019 | Platakis | G06Q 10/06316 |
| 2004/0230636 A1* | 11/2004 | Masuoka | G06F 9/451 708/800 |
| 2007/0106495 A1 | 5/2007 | Ramsey et al. | |
| 2009/0111425 A1 | 4/2009 | Forbes et al. | |
| 2009/0240546 A1 | 9/2009 | Sato | |
| 2010/0145752 A1 | 6/2010 | Davis et al. | |
| 2010/0223575 A1 | 9/2010 | Leukart et al. | |
| 2010/0257015 A1 | 10/2010 | Molander et al. | |
| 2011/0145822 A1 | 6/2011 | Rowe et al. | |
| 2011/0288900 A1 | 11/2011 | Mcqueen et al. | |
| 2011/0289041 A1 | 11/2011 | Hunt et al. | |
| 2012/0311585 A1 | 12/2012 | Gruber et al. | |
| 2013/0014026 A1* | 1/2013 | Beringer | G06Q 10/06311 715/753 |
| 2013/0091453 A1 | 4/2013 | Kotler | |
| 2013/0212582 A1* | 8/2013 | Mazzoleni | G06Q 10/0633 718/100 |
| 2013/0275429 A1* | 10/2013 | York | G06F 16/435 707/737 |
| 2014/0012616 A1 | 1/2014 | Moshenek | |
| 2014/0289265 A1 | 9/2014 | Mustaine | |
| 2015/0120375 A1 | 4/2015 | Nelson et al. | |
| 2016/0026725 A1 | 1/2016 | Browne et al. | |
| 2016/0086116 A1* | 3/2016 | Rao | G06F 3/0481 705/7.21 |
| 2016/0180279 A1* | 6/2016 | Koerner | G06Q 50/01 705/7.15 |
| 2016/0232013 A1* | 8/2016 | O'Neill | G06F 9/451 |
| 2017/0024437 A1* | 1/2017 | Look | G06F 16/242 |
| 2017/0063611 A1* | 3/2017 | Sheba | H04L 41/22 |
| 2017/0293890 A1 | 10/2017 | Sanchez et al. | |
| 2018/0129994 A1 | 5/2018 | Fowler et al. | |
| 2018/0197125 A1 | 7/2018 | Standefer et al. | |

OTHER PUBLICATIONS

Yorke-Smith et al., "Like an Intuitive and Courteous Butler: A Proactive Personal Agent for Task Management", May 10-15, 2009, Proc. of 8th Int. Conf. on Autonomous Agents and Multiagent Systems, (AAMAS 2009),Budapest, Hungary, pp. 337-344. (Year: 2009).*
"Configuring Task Functionality", http://help.adobe.com/en_US/livecycle/9.0/workbenchHelp/help.htm?content=000995.htm, Retrieved on: Nov. 18, 2016, 21 pages.
Delossantos, Kate, "Using a Master Task List", https://appfluence.com/productivity/master-task-list/, Published on: Apr. 28, 2016, 13 pages.
Ward, Galen,, "All Your Tasks—One Screen", http://web.archive.org/web/20140728153710/https://tacoapp.com/, Published on: Jul. 28, 2014, 4 pages.
"My Dashboard—Asana", https://asana.com/guide/help/fundamentals/dashboards, Retrieved on: Nov. 18, 2016, 12 pages.
Dube, Ryan, "Coolendar—A Cool Calendar & To-Do List in One", http://www.makeuseof.com/tag/coolendar-calendar-todo-list/, Published on: Sep. 7, 2011, 6 pages.
"Orderly—Todo Lists, Location Based Reminders on the App Store", Retrieved From: https://itunes.apple.com/in/app/orderly-todo-lists-location/id506632088?mt=8, Nov. 18, 2016, 2 Pages.
"Wunderlist—Keep your Life in Sync", Retrieved From: https://www.wunderlist.com/, Dec. 31, 2015, 4 Pages.
"Non Final Office Action Issued in U.S. Appl. No. 15/429,402", dated Jun. 12, 2020, 21 Pages.
"Office Action Issued in European Patent Application No. 18701953.4", dated May 7, 2020, 6 Pages.
"Summons to Attend Oral Proceedings Issued in European Patent Application No. 18701953.4", Mailed Date: Sep. 28, 2020, 9 Pages.
"Non Final Office Action Issued in U.S. Appl. No. 15/429,402", dated Jul. 7, 2021, 23 Pages.
"Final Office Action Issued in U.S. Appl. No. 15/429,402", dated Jan. 29, 2021, 25 Pages.
"International Search Report & Written Opinion Issued in PCT Application No. PCT/US2018/012436", dated Mar. 13, 2018, 12 Pages.

* cited by examiner

Query: http://.../collection300/task123?$expand=taskOn

Query: http://.../collection300/task123

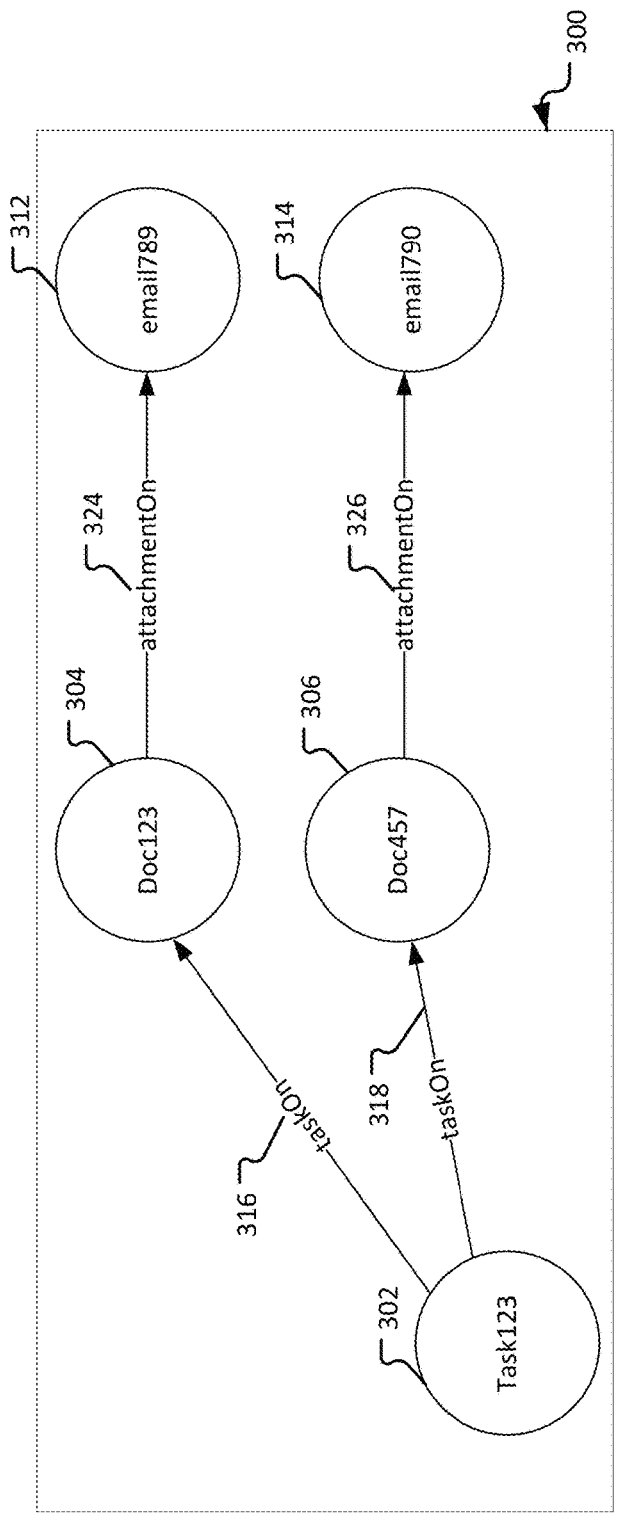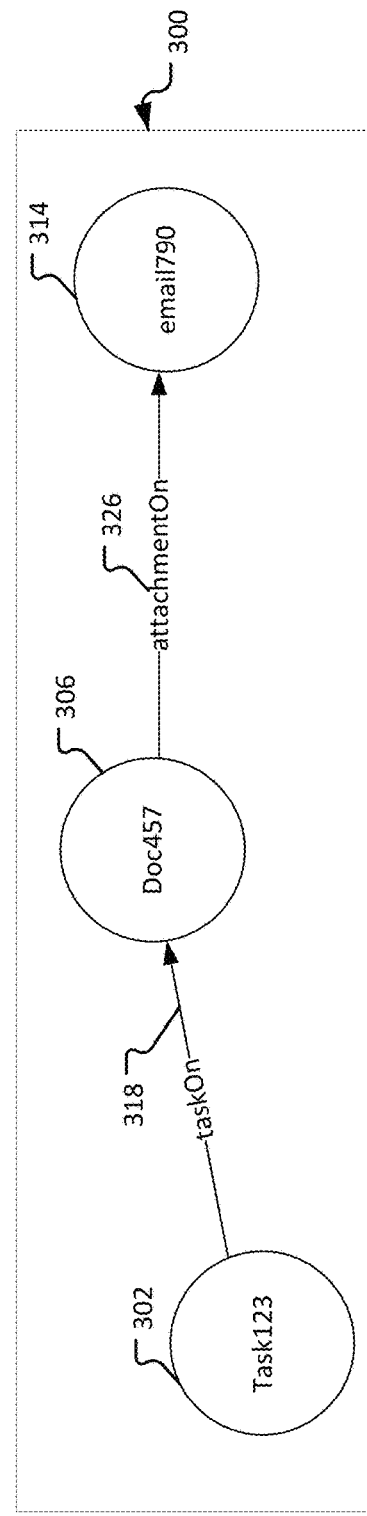

MASTER VIEW OF TASKS

CROSS-REFERENCE TO RELATED APPLICATIONS

This application claims priority to U.S. Provisional Application Ser. No. 62/443,250, filed Jan. 6, 2017, entitled "Tasks Across Multiple Accounts," which application is incorporated herein by reference in its entirety.

BACKGROUND

Task management systems provide for tracking and managing tasks through the life cycle of the tasks. Over the years, various task management systems have evolved. Many of these systems enable users to create and manage tasks. However, these systems lack interoperability and, thus, do not provide for accessing or managing the tasks created by other task management systems. As a result, users often must access multiple task management systems to ascertain a global (e.g., comprehensive) view of their tasks and make determinations related to global task priorities.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Examples of the present disclosure describe systems and methods of managing user tasks using isolated collections of data. In aspects, input may be received by a task management application/service. The task management application/service may analyze the input to determine isolated collections of resources identifying tasks associated with one or more user accounts. The task management application/service may aggregate and analyze the tasks to determine associations between the tasks, to classify tasks and/or to prioritize tasks. The task management application/service may use the analyzed data to provide notifications, prompt user action and/or provide query results.

Examples of the present disclosure further describe systems and methods of presenting aggregated views of disparate tasks. In aspects, the task management application/service described above may present, in a user interface, tasks aggregated using isolated collections of data. The interface may provide a single master view of tasks aggregated from disparate data stores and/or user accounts associated with the user. The tasks of the master view may be organized according to one or more criteria. The interface may further provide for interacting with the tasks in the master view without opening the application or service that originated the task.

This Summary is provided to introduce a selection of concepts in a simplified form that are further described below in the Detailed Description. This Summary is not intended to; identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 3A-E illustrate an example isolated collection of data as described herein.

DETAILED DESCRIPTION

Figure 1:
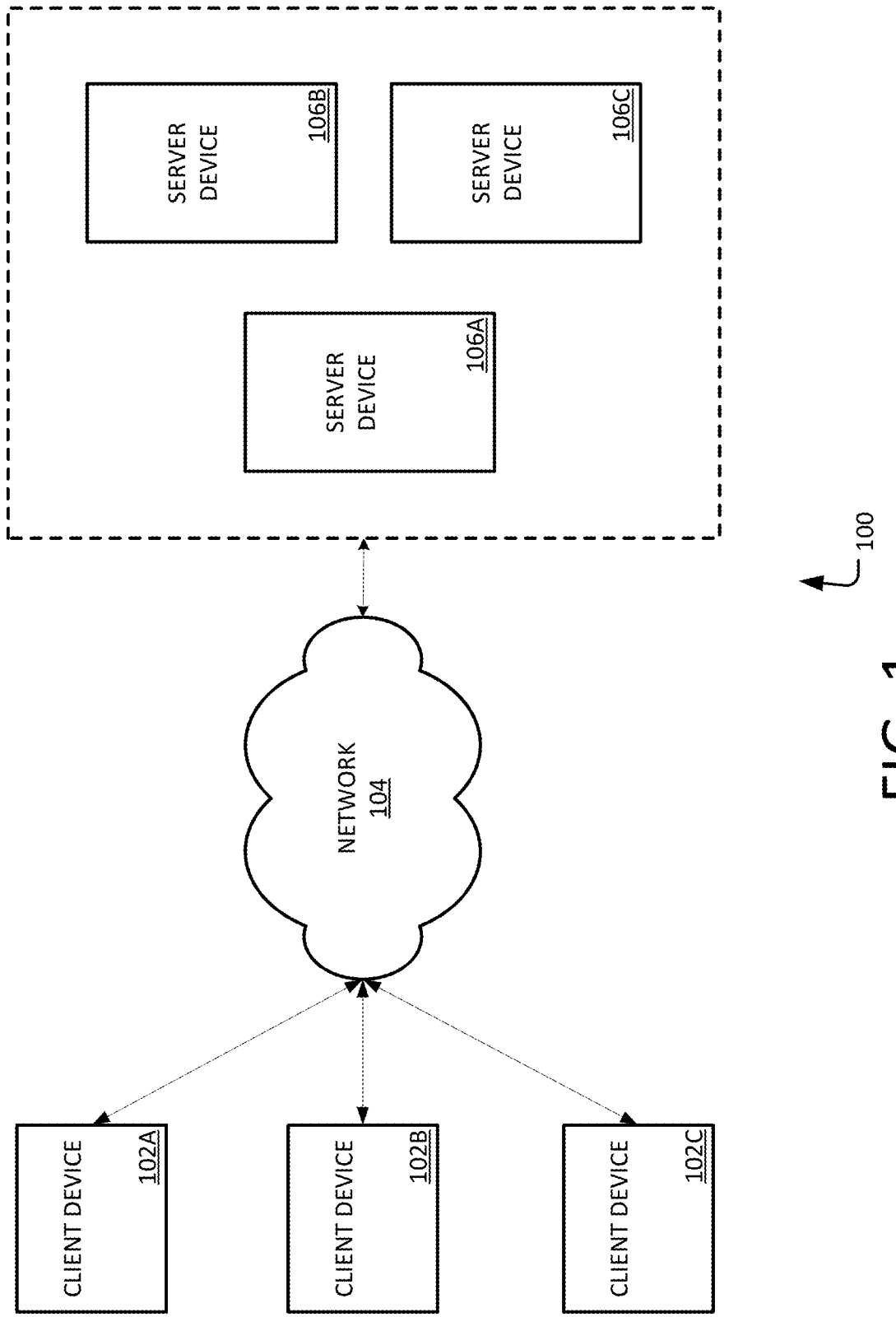
FIG. 1 illustrates an overview of an example system for implementing an isolated collection of data as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods of managing user tasks using isolated collections of data. In aspects, an application or service for managing tasks associated with isolated collections of asserted data may be accessible to a client. An isolated collection of asserted data, as used herein, may refer to one or more asserted resources and relationships between those resources. In examples, a resource may correspond to a person, an entity, a file, a task, an electronic communication, a document (or portion thereof), a calendar event, etc. A resource may be associated with a resource identifier (e.g., uniform resource locator (URL), uniform resource name (URN), etc.). A resource identifier may identify a resource and enable interaction with representations of the resource over a network. A relationship may identity associations between one or more resources and/or resource identifiers. Such relationships may be identified and/or determined manually, using one or more rule sets, or using semantic web technologies (e.g., resource description framework (RDF), RDF schema (RDFS), SPARQL Protocol and RDF Query Language (SPARQL), Web Ontology Language (OWL), etc.).

In aspects, an isolated collection may comprise one or more resources, resource identifiers and/or relationships. An isolated collection may also comprise permission information, one or more rule sets and/or metadata (e.g., resource/relationship description properties, such as title, creator, subject, description, publisher, contributor, date, type format, identifier, source, language, relation, coverage, rights, etc.). A resource and/or a relationship (and corresponding data) may be referred to as "asserted" when the resource and/or relationship is not inferred or defined by the isolated collection. For example, a resource/relationship may be asserted if it is explicitly defined, determined by querying or interacting with a resource provider or data store, or the like. In contrast, a resource/relationship (and corresponding data) may be referred to as "inferred" when the isolated collection defines a resource/relationship (or property thereof) using one or more rules of the isolated collection. For example, a resource/relationship may be inferred if an isolated collection (or the application or service managing the isolated collection) executes one or more rules stored by (or specifically associated with) the isolated collection against asserted data stored by the isolated collection. An inferred resource or relationship may provide additional information or enriched information for asserted data (e.g., resources, resource identifiers, relationships, etc.). Inferred data may be stored in, or by, an isolated collection. An isolated collection comprising both asserted data and inferred data may be referred to as an enriched isolated collection of asserted data. As used herein, an isolated collection of asserted data and an enriched isolated collection of asserted data may be referred to as an "isolated collection" or a "Set."

In aspects, the application/service may provide access to a client via an interface for querying, navigating, visualizing, generating and/or modifying tasks associated with one or more isolated collections. For example, the interface may be operable to receive a query for one or more tasks associated with a user. The application/service may analyze the query to determine query data, such as keywords, user account information, geolocation coordinates, time/date information, etc. The query data may be used to identify isolated collection of resources, applications, services, data stores, and/or user accounts comprising (or otherwise associated with) the one or more tasks. The application/service may collect and aggregate tasks from the identified task stores. In at least one example, the application/service may also standardize the collected tasks, such that the interface presents a commonality in appearance or functionality for the tasks. In aspects, the application/service may analyze the aggregated data to determine task classifications (e.g., "home" task, "work" task, "church" task, etc.), task statuses, associations between tasks and/or users, task prioritizations/dependencies, etc. The application/service may then use the analyzed data to provide notifications, prompt/suggest user action, alter isolated collection data, optimize task/project flow, and/or provide query results.

Accordingly, the present disclosure provides a plurality of technical benefits including but not limited to: enabling users to define and identify relationships between resources; inferring rich relationship from a small data set; creating a robust query model; enabling the execution of powerful queries on isolated collections; providing a user interface to create, manage and visualize tasks associated with isolated collections; consolidating tasks across multiple user accounts, using isolated collections to classify tasks and task types; generating correlations and dependencies between tasks; providing optimized and/or prioritized task chains; providing notifications and resolving tasks across disparate task stores; providing context-based reminders/notifications to complete tasks; standardizing task and task data from disparate task stores; generating and predicting metrics related to task status and completion; providing a user interface for viewing and interacting with tasks from disparate data sources; graphically organizing tasks based on implied importance of the tasks, among other examples.

FIG. 1 illustrates an overview of an example system for implementing an isolated collection as described herein. Example system 100 may be a combination of interdependent components that interact to form an integrated whole for performing task management. In aspects, system 100 may include hardware components (e.g., used to execute/run operating system (OS)), and/or software components (e.g., applications, application programming interfaces (APIs), modules, virtual machines, runtime libraries, etc.) running on hardware. In particular aspects, system 100 may provide an environment for software components to execute, evaluate operational constraint sets, and utilize resources or facilities of the system 100. In such aspects, the environment may include, or be installed on, one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic device. As an example of a processing device operating environment, refer to the exemplary operating environments depicted in FIGS. 9-12. In other instances, the components of systems disclosed herein may be distributed across and executable by multiple devices. For example, input may be entered on a client device and information may be processed or accessed from other devices in a network (e.g. server devices, network appliances, other client devices, etc.).

As presented, system 100 comprises client devices 102A-C, distributed network 104, and a distributed server environment comprising one or more servers, such as server devices 106A-C. One of skill in the art will appreciate that the scale of systems such as system 100 may vary and may include additional or fewer components than those described in FIG. 1. In some aspects, interfacing between components of the system 100 may occur remotely, for example, where components of system 100 may be distributed across one or more devices of a distributed network.

In aspects, client devices 102A-C may be configured to receive input via a user interface component or other input means. Examples of input may include voice, visual, touch and text input. The interface component may enable the creation, modification and navigation of various datasets and graphical representations. In examples, the various datasets may comprise (or be otherwise associated with), for example, resource identifiers, resource metadata, relationship information, asserted relationships, graphical mapping information, query data, rule sets, such as, for example, inference rules, authorization information, authentication information, etc., as discussed in further detail below. Generally, the datasets are stored on one or more of server devices 106A-C and are accessible by the client devices 102A-C via a network connection, such as distributed network 104. In some examples, however, the datasets may be at least partially stored on one or more of the client devices 102A-C. The underlying resources represented in the various datasets may be stored locally or in a data store, such as a cloud storage application, accessible to client devices 102A-C. In at least one example, the underlying resources represented in the various datasets (or portions thereof) may be distributed across client devices 102A-C. For instance, client device 102A (e.g., a mobile phone) may locally store a first portion of the resources represented in the dataset, client device 102B (e.g., a tablet) may locally store a second portion of the resources, and client device 102C (e.g., a laptop) may locally store the remaining portion of the resources represented in the dataset. In examples, the client devices 102A-C may have access to all of the resources included in the data set, may have access to a subset of the resources included in the dataset, or, alternatively, may not have access to any of the resources included in the dataset.

Client devices 102A-C may be further configured to provide task management for tasks, activities and/or events associated with the various datasets. In aspects, the interface component may additionally or alternately enable the creation, modification, navigation and/or querying of one or more user accounts. The user accounts may comprise (or be associated with) tasks and activities that were created by, or are particular to, a specific user account. The user accounts may store the tasks in one or more data stores, such as datasets described above. Alternately, the user accounts may simply have access to data stores where tasks are stored. For example, datasets may comprise tasks (and associated data) and indicators of task storage locations. Such indicators may refer to local locations, remote locations, or some combination thereof. Client devices 102A-C may query the task storage locations for tasks and related information corresponding to one or user accounts. Client devices 102A-C may collect and aggregate the query results for the task storage locations. The aggregated query results may be analyzed to generate rich task data, and/or to determine associations between tasks, associations between tasks and users, task dependencies, task classifications, task priority levels, task statuses, task optimizations, task resource allocations, etc. Client devices 102A-C may then generate or receive a result for the queried user accounts and/or user tasks. The result may be presented to a user via, for example, the interface component.

Server devices 106A-C may be configured to store and/or provide access to one or more resources. For example, server device 102A may be a web server, server device 102B may be a device comprising a collaborative messaging tool and a calendaring application, and server device 102C may be electronic mail server. Each of these devices may comprise a repository of resources that is accessible via one or more authorization mechanisms. In some aspects, server devices 106A-C may be configured to store at least a portion of the various data sets and graphical representations, as discussed above. Server devices 106A-C may be further configured to provide analysis services. For example, server devices 106A-C may comprise, or have access to, an analysis component. The analysis component may have access to, for example, task data for a user or one or more user accounts. The analysis component may apply machine learning techniques to the task data to determine one or more associations, classification, or priorities in the task data. In examples, server devices 106A-C may provide the determinations (or an aspect thereof) to a task management application or service.

Figure 2:
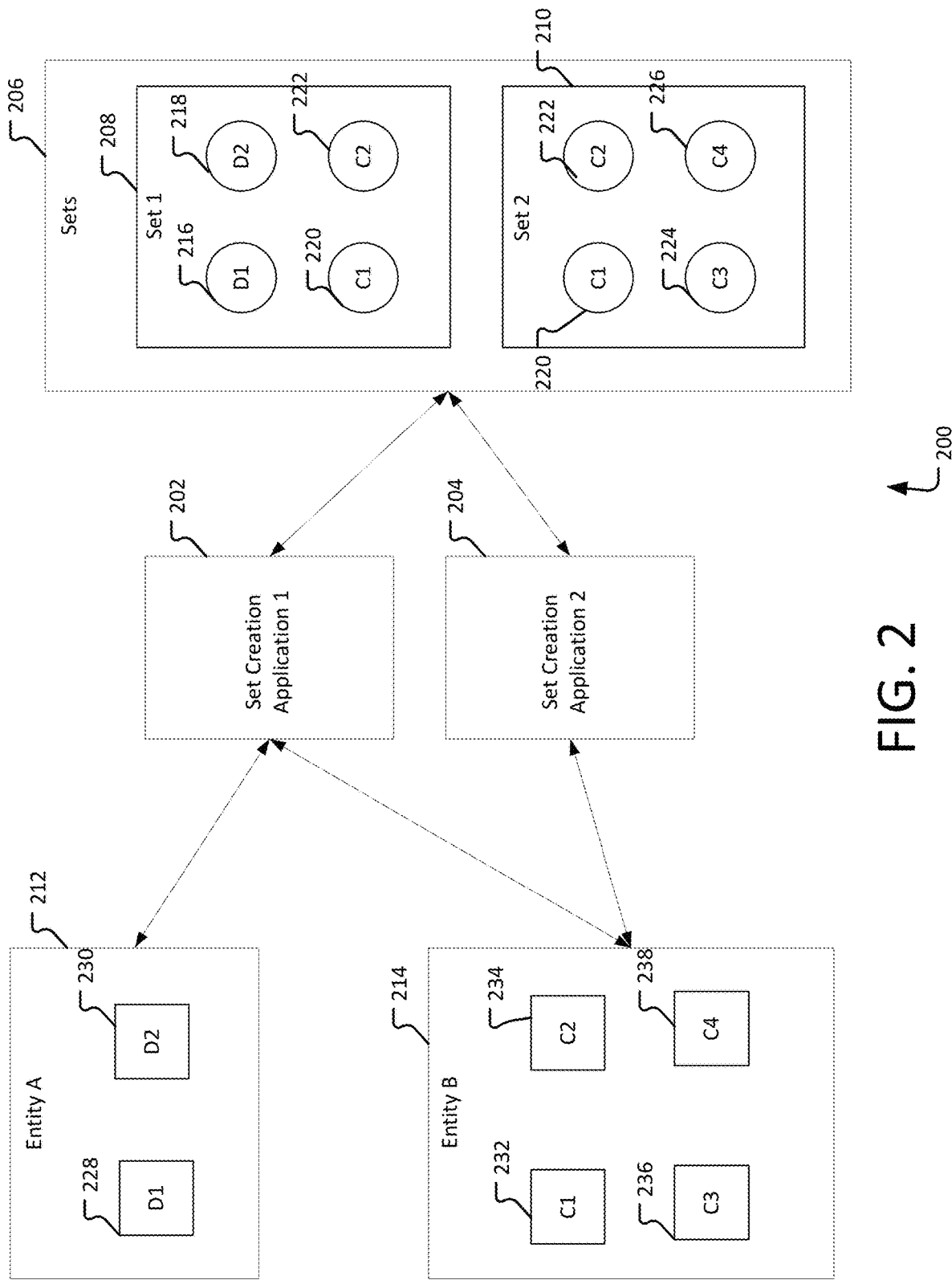
FIG. 2 illustrates an overview of an example system for managing isolated collections of data as described herein.

FIG. 2 illustrates an overview of an example system 200 for managing isolated collections of resource identifiers and corresponding relationships. The isolated collection techniques implemented in system 200 may comprise or be associated with one or more of the task management techniques described in FIG. 1. In alternative examples, a single device (comprising one or more components such as processor and/or memory) may perform the processing described in systems 100 and 200, respectively.

With respect to FIG. 2, system 200 may comprise Set creation applications 202 and 204, Set environment 206, Sets 208 and 210, entities 212 and 214, resources identifiers 216, 218, 220, 222, 224 and 226, and resources 228, 230, 232, 234, 236 and 238. In aspects, Set creation applications 202 and 204 may be an application or service configured to create, infer, manipulate, navigate and visualize various resources, relationships and graphical representations. Set creation applications 202 and 204 may define isolated collections of relationships between resources (e.g., people, files, tasks, mail, documents, calendar events, etc.) and executing queries on those isolated collections. Set creation applications 202 and 204 may further provide for defining and storing rulesets used to infer one or more relationships in the isolated collections, and displaying graphical representations of the isolated collection data. The defined rulesets may be stored in the isolated collection itself, and in some examples is stored as metadata within the isolated collection. In examples, Set creation applications 202 and 204 may be installed and executed on a client device or on one or more devices in a distributed environment. For instance, Set creation application 202 may be installed on client device 102A, Set creation application 204 may be installed on client device 102B, and a Set creation service associated with server device 106A may be accessible to client device 102C.

In aspects, Set creation applications 202 and 204 may have access to a file directory or an execution environment, such as environment 206. Environment 206 may be co-located with a Set creation application, or environment 206 may be located remotely from the Set creation application. Environment 206 may provide access to one or more isolated data collections, such as Sets 208 and 210. In examples, access to the isolated data collections may be determined using one or more permissions sets generated and/or maintained by Set creation applications 202 and 204. The permissions sets may be different across one or more of the isolated data collections. As a result, one or more of the isolated data collections (or functionality associated therewith) may not be accessible from one or more of Set creation applications 202 and 204.

Sets 208 and 210 may respectively comprise isolated collections of asserted and/or inferred resource identifiers and relationships. The relationships in the isolated collections may be defined manually or may be automatically derived using one or more rule sets. The isolated collections may be represented using graphical structures, such as a named graph, that directly relate resources in the data collection and provide for retrieving relationship data with a single operation. Each isolated collection may comprise resource identifiers that are unique to that isolated collection. Alternately, the isolated collections may comprise resource identifiers included in one or more alternate isolated collections. For example, as depicted in FIG. 2, Set 208 may comprise resource identifiers 216, 218, 220 and 222, and Set 210 may comprise resource identifiers 220, 222, 224 and 226. Resource identifiers 216, 218, 220, 222, 224 and 226 may correspond to, and/or identify the location of, one or more resources. As used herein, a resource identifier references an existing resource but is not itself a resource. Exemplary types of resource identifiers include, but are not limited to, a Uniform Resource Identifier (e.g., a Uniform Resource Locator (URL), a Uniform Resource Name (URN) etc.), an IP address, a memory or storage address, and the like. One of skill in the art will appreciate that any type of identifier may be employed by the various aspects disclosed herein without departing from the scope of this disclosure. Identifying the location of a resource may include parsing the resource identifier using, for example, regular expressions, providing one or more portions of the resource identifier to a search utility, executing the resource identifier, etc. In aspects, having access to the data collections does not guarantee access to the resources identified by the resource identifiers included in each data collection. For example, although a user may be able to access and manipulate Set 208, the user may not be authorized to access one or more of the underlying resources corresponding to the resource identifier in Set 208.

Resource providers 212 and 214 may be configured to store and/or provide access to one or more resources. As such, a resource provider as used herein may be a data store, a cloud service provider, a client computing device, a server computing device, a distributed system of devices, such as, for example, an enterprise network, an application, a software platform (e.g., an operating system, a database, etc.), and the like. In aspects, resource providers 212 and 214 may be (or have access to) various different data sources, such as content providers, data stores, various sets of application data, and the like. The data stores may comprise one or more resources corresponding to one or more resource identifiers. For example, as depicted in FIG. 2, resource provider 212 may be a data store comprising various different types of resources such as resource 228 (e.g., document 1 (D1)) and resource 230 (e.g., presentation2 (P1)) and resource provider 214 may be a contact management application comprising contact resources 232 (e.g., contact 1 (C1)), 234 (e.g., contact 2 (C2)), 236 (e.g., contact 3 (C3)) and 238 (e.g., contact 4 (C4)). In this example, resource identifier 216 may correspond to resource 228; resource identifier 218 may correspond to resource 230; resource identifier 220 may correspond to resource 232; resource identifier 222 may correspond to resource 234; resource identifier 224 may correspond to resource 236; and resource identifier 226 may correspond to resource 238.

In some aspects, resource providers 212 and 214 (or resources associated therewith) may be accessible by Set creation applications 202 and 204. For example, Set creation applications 202 and 204 may access resource providers 212 and 214 to determine the existence of resources and/or retrieve information associated with the resources (e.g., resource metadata, resource location, resource identifiers, permission sets, authorization data, etc.). In an alternate example, Set creation applications 202 and 204 may not have access to resource providers 212 and 214. Instead, resource providers 212 and 214 may, for example, publish or broadcast resources and/or resource information to one or more devices or storage locations. Set creation applications 202 and 204 may then access the devices or storage locations receiving the resources/resource information to determine the existence of resources. In yet another example, Set creation applications 202 and 204 may receive resources/resource information directly. For instance, a user may use an interface accessible to Set creation applications 202 and 204 to create or upload on or more resources. In such aspects, the retrieved resources/resource information may be used to determine a set of resource identifiers corresponding to one or more of the available resources. The set of resource identifiers may be used to create one or more isolated collections. As noted above, the resource identifiers may be, or include, a durable URI for its corresponding resource. For instance, the resource identifier 216 may include the URI for the actual document (D1) 228. Accordingly, in such an example, a user is able to determine the location of the document (D1) 228 from the Set, and, depending on authorization and access restrictions, retrieve the document (D1) 228. As another example, as depicted in FIG. 2, resource provider 212 may be accessed by Set creation application 202. Set creation application 202 may determine that resource provider 212 comprises at least resources 228 and 230, and may determine resource identification information for each of the resources. Based on the determined resource identification information, resource identifiers 216 and 218 may be respectively applied/correlated to resources 228 and 230, and provided to environment 206. Environment 206 may then make resource identifiers 216 and 218 eligible for an inclusion analysis into one or more isolated collections.

Figure 3A:
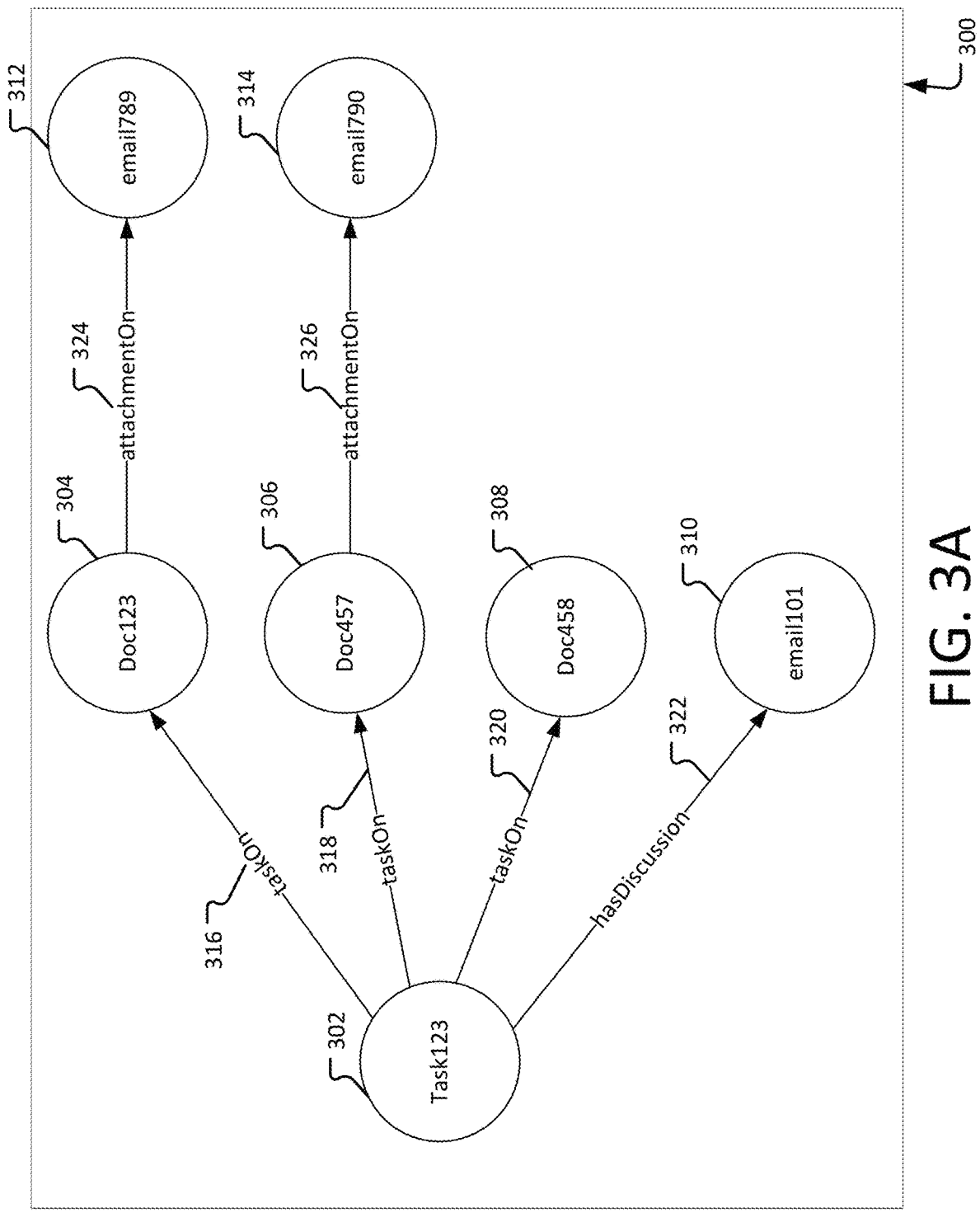

FIG. 3A illustrates an example isolated collection 300 of resource identifiers and corresponding relationships. Example isolated collection 300 comprises resource identifiers 302, 304, 306, 308, 310, 312 and 314, and relationships 316, 318, 320, 322, 324 and 326. In aspects, isolated collection 300 may be generated and/or manipulated using a collection creation utility that may be included as part of a Set creation application as discussed above. When presented in graph form as depicted in the FIG. 3A, each resource identifier may be referred to as a "node" and each relationship may be referred to as an "edge." The collection creation utility may also identify resources and/or determine resource types for collections using one or more rulesets that may include rules defined in accordance with semantic web technologies, such as resource description framework (RDF), RDF schema (RDFS), SPARQL Protocol and RDF Query Language (SPARQL), Web Ontology Language (OWL), etc. For example, isolated collection 300 includes a resource identifier 312 that represents an underlying resource, "email789" in the depicted example. Similarly, resource identifier 304 represents a resource document, "Doc123," and resource identifier 302 represents a resource task, "Task123." Each of the resources and relationships included in the isolated collection 300 may have been asserted by a user through a Sets creation application. For instance, a developer may manually add each of the resource identifiers and the relationships between the resource identifiers. As an example, the developer may manually indicate that the "task123" is a task on "Doc123," as represented in the isolated collection 300 by the "taskOn" relationship 316. The resource identifiers and relationships may also be asserted by an external bot or application created by a user. For instance, an add-in may be programmed to monitor activity in a browser or other application to track usage of the application. Based on the usage of the application, the add-in may send additional resources and relationships to be included in the isolated collection 300.

In contrast to the asserted resource identifiers and relationship, a collection creation utility may execute a ruleset to determine additional relationships and resource types, referred to herein as "inferred relationships" and "inferred resource identifiers" or "inferred resource types." For example, upon execution of a ruleset, the collection creation utility may determine that resource identifier 312 represents an email message, and resource identifier 304 represents a document. Generation of inferred relationships and resources is discussed in further detail below. Based on this determination, the collection creation utility may assign relationship 324 (e.g., "attachmentOn") to define the association between resource identifier 312 and resource identifier 304. The collection creation utility may utilize a similar approach to assign relationship 326 (e.g., "attachmentOn") to define the association between resource identifier 314 and resource identifier 306.

Isolated collection 300 further depicts that resource identifier 302 is associated with resources identifiers 304, 306 and 308 and resource identifier 310. The collection creation utility may determine that the resource identifier 302 represents a task to be performed on identifiers 304, 306 and 308. Based on this determination, the collection creation utility may assign relationships 316, 318 and 320 (e.g., "taskOn") to define the association between resource identifier 302 and resource identifier 304, 306 and 308. The collection creation utility may further determine that resource identifier 310 represents an email (without an attachment) that comprises a discussion of one or more aspects of resource identifier 302. Based on this determination, the collection creation utility may assign relationship 322 (e.g., "hasDiscussion") to define the association between resource identifier 302 and resource identifier 310.

Figure 3C:
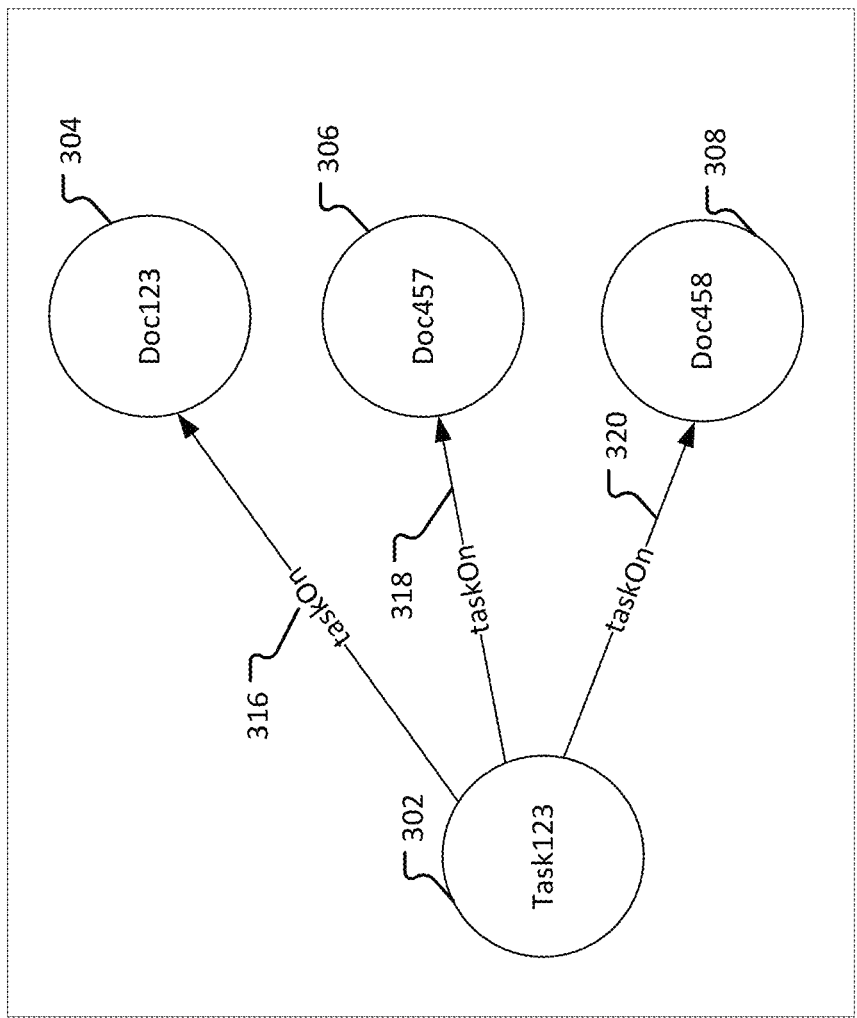
Figure 3B:
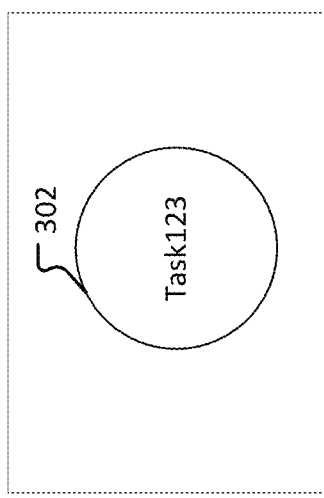

FIGS. 3B-3E illustrate an example query model that may be used to traverse isolated collection 300. In aspects, queries may be executed via an interface provided by the collection creation utility. A query may be executed against one or more files and/or directories comprising information, such as resource identifiers, resource type, resource metadata, permission data, etc. The query results may be visualized in a graph form as one or more collections, such as isolated collection 300. For example, the entire isolated collection 300 dataset may comprise only those elements illustrated in collection 300 (e.g., resource identifiers 302, 304, 306, 308, 310, 312 and 314 and relationships 316, 318, 320, 322, 324 and 326). In this particular example, resource identifier 312 may represent an email comprising the subject "API Design" and resource identifier 314 may represent an email comprising the subject "Sets." The query 'http:// . . . /collection300/task123' may be executed against isolated collection 300. The query results may comprise resource identifier 302 and be visualized as illustrated. In FIG. 3C, the query has been amended to 'http:// . . . /collection300/task123?$expand=taskOn' and executed against isolated collection 300. The query results may comprise resource identifiers 302, 304, 306 and 308 and relationships 316, 318 and 320, and be visualized as illustrated. In FIG. 3D, the query has been amended to 'http:// . . . /collection300/task123?$expand=taskOn($expand=attachmentOn)' and executed against isolated collection 300. The query results may comprise resource identifiers 302, 304, 306, 308, 312 and 314 and relationships 316, 318, 320, 324 and 326, and be visualized as illustrated. In FIG. 3E, the query has been amended to 'http:// . . . /collection300/task123?($expand=taskOn($expand=attachmentOn)($filter=Subject eq 'Sets'))' and executed against isolated collection 300. As only resource identifier comprises the subject "Sets", the query results may comprise resource identifiers 302, 306 and 314 and relationships 318 and 326, and be visualized as illustrated.

Figure 4:
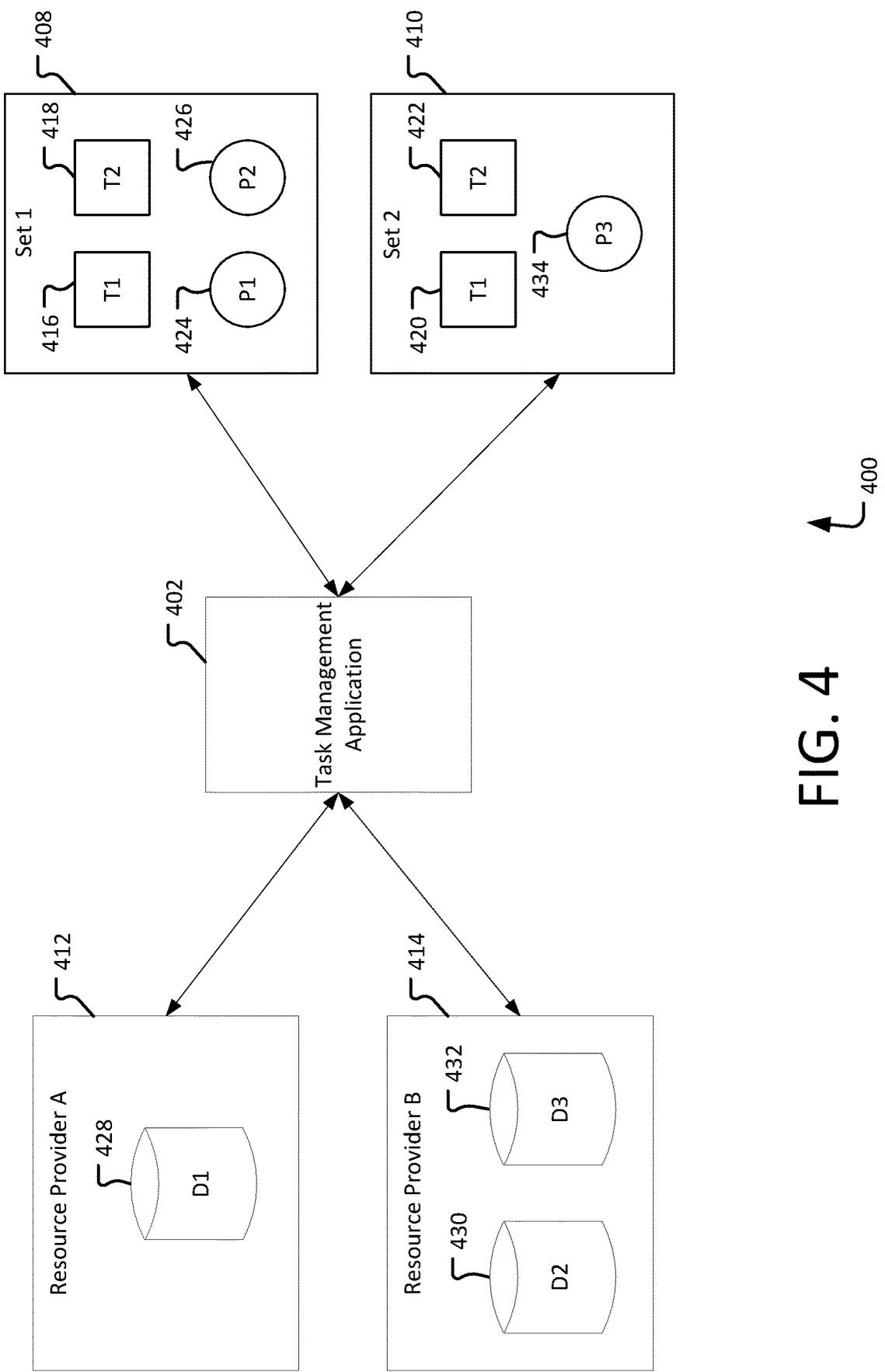
FIG. 4 illustrates an overview of an example system for managing user tasks using isolated collections of data as described herein.

FIG. 4 illustrates an overview of an example system for managing user tasks using isolated collections of data as described herein. In alternative examples, a single device (comprising one or more components such as processor and/or memory) may perform the processing described in system 400. As shown in FIG. 4, system 400 may comprise task management application 402, Sets 408 and 410, entities 412 and 414, tasks 416, 418, 420 and 422, pointers 424, 426 and 434, and data stores 428, 430 and 432. In aspects, task management application 402 may be an application or service configured to query, navigate, visualize, generate, label and/or modify tasks associated with one or more isolated collections. For example, task management application 402 may provide an interface (e.g., a user interface, an API, etc.) enabling a user or client device to provide input. Task management application 402 may use the input to generate one or more queries or search criteria. The queries/search criteria may task enable management application 402 to identify and/or collect resources, tasks and task data (e.g., task metadata, assigned users, dependencies, status, resource allotment, etc.) for a requesting user. Task management application 402 may additionally or alternately be configured to apply decision logic to tasks and task data in order to identify (and retrieve information from) isolated collections and task stores comprising relevant tasks, determine the user accounts associated with a particular user or client device, determine associations and prioritizations for tasks, classify tasks, optimize tasks and task chains, and generate and provide notifications and/or reminders. In examples, task management application 402 may be installed and executed on a client device, such as client devices 102A-C, on a server device, such as server devices 106A-C, or on some combination thereof.

In aspects, task management application 402 may have access to one or more isolated collections, such as Sets 408 and 410. Sets 408 and 410 may be similar in function and features to Sets 208 and 210, described above. For example, as depicted in FIG. 4, Set 408 may comprise tasks 416 and 418 and pointers 424 and 426, and Set 210 may comprise tasks 420 and 422, and pointer 434. Tasks 416, 418, 420 and 422 may correspond to events, actions or sequences of actions and/or events that contribute to the completion of a job or objective. Pointers 424, 426 and 434 may provide the address or location of a resource provider and/or data store comprising one or more tasks or task data. For example, with respect to FIG. 4, pointer 424 provides the location to data store 428, pointer 426 provides the location to data store 430, and pointer 434 provides the location to data store 432. In at least one aspect, a pointer may additionally comprise or have access to an authorization or permission set for accessing or querying the corresponding entity/data store. Resource providers 412 and 414 may be similar in function and features to resource providers 212 and 214, described above. For example, as further depicted in FIG. 4, resource provider 412 may comprise data store 428, and resource provider 414 may comprise data stores 430 and 432. In examples, data source 430 and 432 may correspond to an application, service or the like comprising tasks and task data for one or more users or user accounts.

Figure 5:
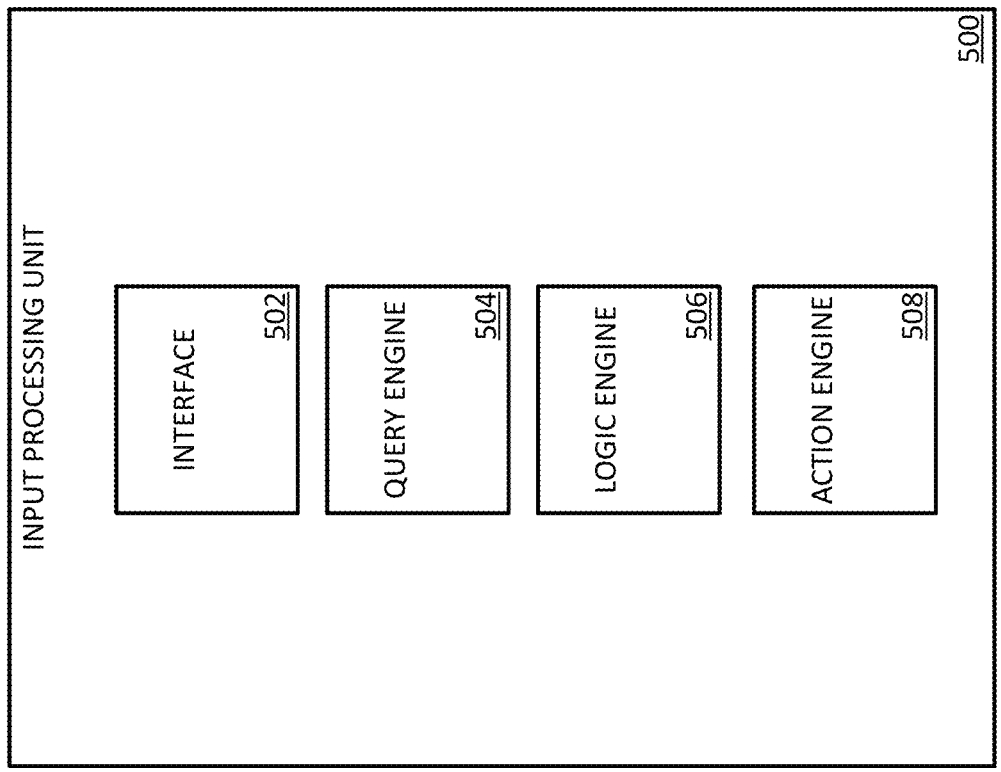
FIG. 5 illustrates an example input processing unit for managing user tasks using isolated collections of data as described herein.

FIG. 5 illustrates an example input processing unit 500 for managing user tasks using isolated collections of data as described herein. The task management techniques implemented by input processing unit 500 may comprise the task management techniques and content described in FIG. 4. In alternative examples, a distributed system (comprising one or more components such as processor and/or memory) may perform the processing described in system 400.

With respect to FIG. 5, input processing unit 500 may comprise interface 502, query engine 504, logic engine 506 and action engine 508. Interface 502 may be configured to receive and process input. For example, interface 502 may receive a query for tasks associated with a particular user. Interface 502 may parse (or cause to be parsed) the query and/or query wrapper to determine data (e.g., query data), such as keywords, user data, user account information, client device information, geolocation coordinates, time/date information, etc. Interface 502 may use the parsed data to determine additional information related to the query and/or query data, such as contextual information, user intention, data storage locations and accessibility, stored task formats, etc. In examples, determining the additional information may include the use of machine learning, rule sets, and/or one or more predictive algorithms. Interface 502 may provide the query data to a querying utility, such as query engine 504. In some aspects, interface 502 may be further configured to enable navigating, organizing and modifying tasks and associated task data, visualizing and sorting query results, and transmitting notifications and instructions to other devices. In at least one such aspect, interface 502 may additionally provide access to one or more applications, services and/or task stores associated with one or more tasks. For example, interface 502 may serve as an entry point to set creation applications 202 and 204, Sets, 208, 210, 408 and 410, resource providers 212, 214, 412 and 414 an isolated collection, or the like. Such entry points may provide for interacting with tasks and task data directly from the interface 502.

Query engine 504 may be configured to generate queries for task information. In aspects, query engine 504 may access the query data generated by interface 502. Query engine 504 may use the query data to identify storage locations comprising tasks associated with a user. In examples, identified storage locations may include one or more isolated collections of data, data stores identified in the isolated collections of data (e.g., via pointers), task stores, and the like. Query engine 504 may generate one or more queries for each of the identified storage locations. In examples, queries may be generated based on one or more portions of the query data (e.g., permission sets, authentication data, authorization information, storage location operating system/configuration, expected syntax, etc.). Query engine 504 may submit the queries directly to the identified storage locations, or to a query executing utility. The query executing utility may then process and submit the queries to the identified storage locations. Query engine 504 may be further configured to receive and/or aggregate the response data. In aspects, query engine 504 may receive or collect response data from the queried storage locations. Each of the query responses in the response data may comprise one or more tasks and/or associated task data. Query engine 504 may aggregate the response data and sort/organize the response data according to one or more categories. For example, the response data may be organized according to user, user account type, task type, creation date, due date, task owner, status, etc. The aggregated and/or organized data may be presented using interface 502.

Logic engine 506 may be configured to apply decision logic to one or more sets of tasks. In aspects, logic engine 506 may have access to response data provided by query engine 504. Logic engine 506 may analyze the response data to determine associations between one or more tasks, task dependencies, task classifications, optimizations for tasks and/or related activities, task statuses, resource allocations, etc. Analyzing the response data may include using a machine learning model or decision logic. For example, logic engine 506 may determine a classification for a new task based on the geolocation and timestamp associated with a received query. As another example, logic engine 506 may determine a classification for a new task by determining the relative location (and/or relationship) of the task to other tasks within an isolated collection of data. As yet another example, logic engine 506 may analyze keywords of tasks in differing task stores to determine that two or more tasks are related by time, geolocation, intent, task instruction, task creator, etc. As still another example, logic engine 506 may determine an optimized or suggested order for completing tasks by determining one or more tasks dependencies and/or resource allocations. In such an example, logic engine 506 may also provide a set of facts or reasons for making such a determination. In some aspects, logic engine 506 may provide the results of the response data analysis (or an indication thereof) to action engine 508.

Action engine 508 may be configured to initiate one or more task-related actions. In aspects, action engine 508 may have access to analysis data generated by logic engine 506. Action engine 508 may use the analysis data to initiate one or more actions related to the user and/or corresponding task. For example, based on a determination that the completion date of a task has arrived, action engine 508 may generate a reminder related to the task or task parameters. The reminder may be transmitted to the client device used to submit the query to interface 502, or to a notification service. The notification service may deliver the notification to one or more devices associated with the user. As another example, based on a determination that two tasks are related, action engine 508 may update one or more isolated collections to reflect the determined relationship. As yet another example, based on a determination that a task has been completed, action engine 508 may provide a task completion notification to one or more data stores comprising the task (or some version thereof). Alternately, action engine 508 may generate and send an instruction or command to mark the task as complete in the one or more data stores. As still another example, action engine 508 may restructure (or provide a suggestion to restructure) the order or content of one or more tasks. The restructured list of tasks may then be presented via interface 502.

Figure 6:
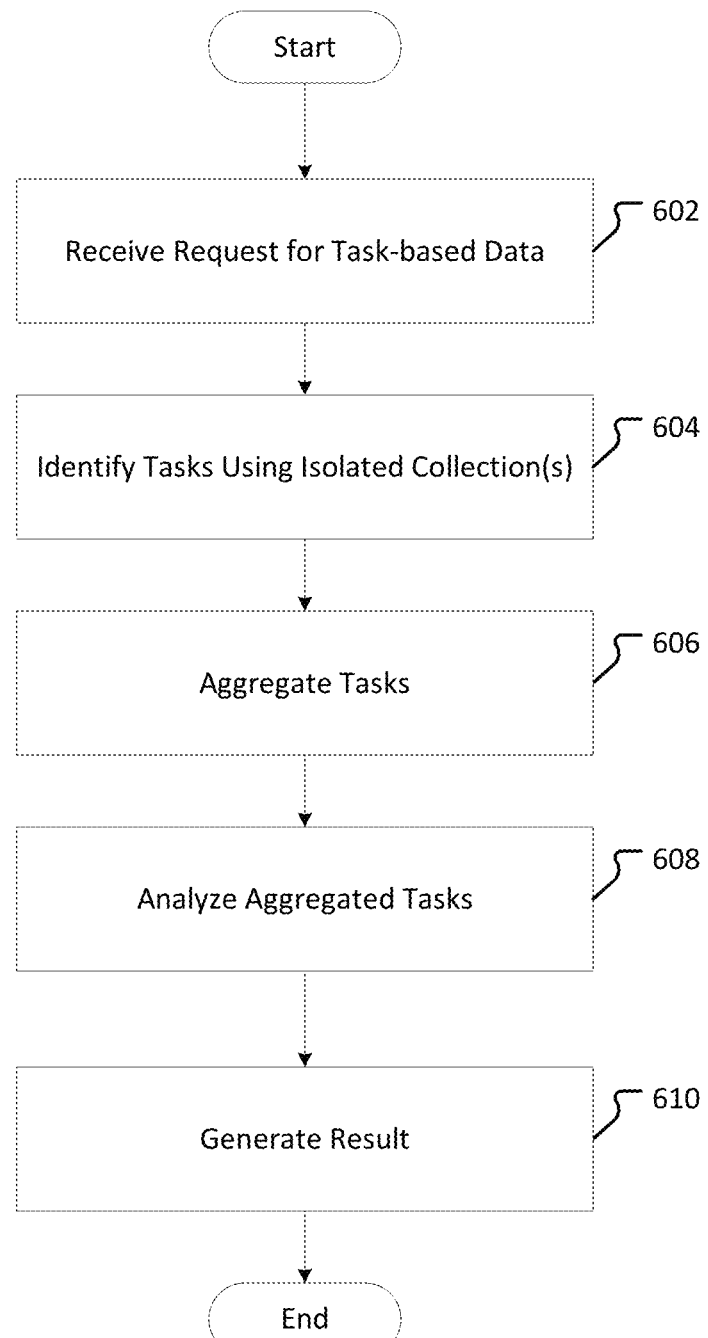
FIG. 6 illustrates an example method of managing user tasks using an isolated collection of data as described herein.

FIG. 6 illustrates an example method 600 of managing user tasks using an isolated collection. In aspects, method 600 may be executed by an exemplary system such as system 100 of FIG. 1. In examples, method 600 may be executed on a device comprising at least one processor configured to store and execute operations, programs or instructions. However, method 600 is not limited to such examples. In other examples, method 600 may be performed on an application or service for providing task management. In at least one example, method 600 may be executed (e.g., computer-implemented operations) by one or more components of a distributed network, such as a web service/distributed network service (e.g. cloud service).

Example method 600 begins at operation 602 where a request is received. In aspects, the request may be received by a task managing component, such as task management application 402. The request may be received via an interface, such as interface 502, and may comprise request data related to one or more user tasks. The request data may include keywords, user data, user account information, client device information, geolocation coordinates, time/date information, etc. In examples, the request data may be parsed and one or more request data elements may be identified. The identified data may be used to assign additional data elements to the query data, such as contextual information, a user intention, etc. For example, a received request to access a user's tasks may comprise geolocation data. The geolocation data may be compared to a list of "known locations" for the user. When the geolocation data matches a known location (e.g., home, work, etc.), the location or a corresponding context label (e.g., work, non-work, etc.) may be added to the query data associated with the request.

At operation 604, one or more tasks may be identified using at least one or more isolated collections. In aspects, request data may be used to identify tasks and/or data sources comprising tasks. Examples of data sources may include isolated collections of data, task stores, application data, task management services, etc. In some aspects, identifying tasks may comprise generating queries using one or more portions of the query data. For example, keywords, a date range, a user account type or a context category associated with one or more tasks may be identified in the request data. The identified data may be used to generate one or more queries using a querying component, such as query engine 504. The queries may identify the potential data sources using an index of tasks or resource management utility, such as Set creation applications 202 and 204. For example, one or more queries may be generated and sent to one or more isolated collections based on the user's access the isolated collections via a resource management utility. In other aspects, identifying tasks may comprise receiving notifications related to task status, task creation and/or task modification. For example, a task managing component may receive a task completion notification from an application, service or notification interface. In another example, an isolated collection may receive an update from a resource provider, such as resource providers 412 and 414. The update may be received via a webhook (e.g., an API used for event notification) and may dictate a modification to a pointer in the isolated collection corresponding to the resource provider.

At operation 606, tasks may be collected and aggregated. In aspects, task data (e.g., tasks and associated task data) identified at operation 604 may be collected by a component, such as query engine 504. In examples, collecting the task data may include standardizing and/or normalizing tasks from various task stores. Standardizing tasks may include assigning the tasks to task categories or types, modifying the task type of one or more tasks, generating generic task types, adding/removing task elements from tasks, modifying task descriptions, etc. In some aspects, the task data may be organized according to one or more categories or criteria. For example, collected task data may aggregated, de-duplicated and/or organized according to user, user account type, task type, creation date, due date, task owner, status, etc. The aggregated task data may be presentable to a user via an interface, such as interface 502. The interface may provide for querying, organizing, navigating, visualizing, generating, resolving and/or modifying tasks and associated task data.

At operation 608, task data may be analyzed. In aspects, one or more sets of aggregated task data may be provided to an analysis component, such as logic engine 506. The analysis component may analyze the aggregated task data to determine, for example, associations between one or more tasks, associations between tasks and users, task dependencies, task classifications, task priority levels, task statuses, optimizations for tasks and/or related activities, resource allocations, etc. Task analysis may include the use of one or more machine learning models, decision logic, isolated collection mappings, rule sets, and the like. For example, a set of aggregated task data may comprise tasks relating to a user's home and work accounts. The home account may comprise the task "Purchase additional work supplies," and the home account may comprise the task "Get milk." Upon accessing the set of aggregated task data, the analysis component may determine the location from which the user typically purchases work supplies is proximate to the location from which the user typically purchases milk. As a result, the two tasks may be identified as associated by geolocation, such that the completion of (or a notification regarding) one of the tasks causes a reminder/notification regarding the other task. As another example, a set of aggregated task data may comprise tasks relating to a user's work account. One of the tasks may have been created by the user, one of the tasks may have been created by the user's manager, and one of the tasks may have been created by the user's subordinate. Upon accessing the set of aggregated task data, the analysis component may determine tasks created by the user's subordinate are lower priority than tasks created by the user and the user's manager, and tasks created by the user's manager are higher priority than tasks created by the user. As a result, a priority may be assigned to each task and/or a suggested order of execution may be provided. As yet another example, a set of aggregated task data may comprise tasks relating to a user's work account and a co-worker's work account. The user's work account may comprise a task that is dependent on the completion of a task assigned to the user's co-worker. Upon accessing the set of aggregated task data, the analysis component may determine the dependency. As a result, while the co-worker's task is incomplete, notifications regarding the status of the user's task may be suppressed when the user is not acting in a work context (e.g., the user is not physically located at work or logged into the work account).

At operation 610, a result may be generated for the request. In aspects, the results of one or more analyses performed during (or as a result of) operation 608 may be accessible by an action-performing component, such as action engine 508. The analysis results may be used to generate one or more commands or sets of instructions to be executed based on a set of criteria. For example, based on a determination that two tasks are associated, a trigger may be created to generate a reminder or notification when one of the tasks is updated, modified or incomplete. The trigger (or an indication thereof) may be stored by the action-performing component, transmitted to the requesting client device, or transmitted to one or more task management applications/services. In at least one example, commands or instructions stored by the action-performing component may be subject to interaction (e.g., viewing, navigation, modification, deletion, etc.) using an interface, such as interface 502. As another example, in response to a request to view the tasks associated with a user, a result set may be produced. The result set may comprise at least a subset of the tasks located in one or more isolated collection associated with one or more of the user's profiles or accounts. The result set may additionally comprise at least a subset of the tasks in task stores identified by pointers in the isolated collections. The result set may be provided to one or more device and/or presented using an interface, such as interface 502.

Figure 7B:
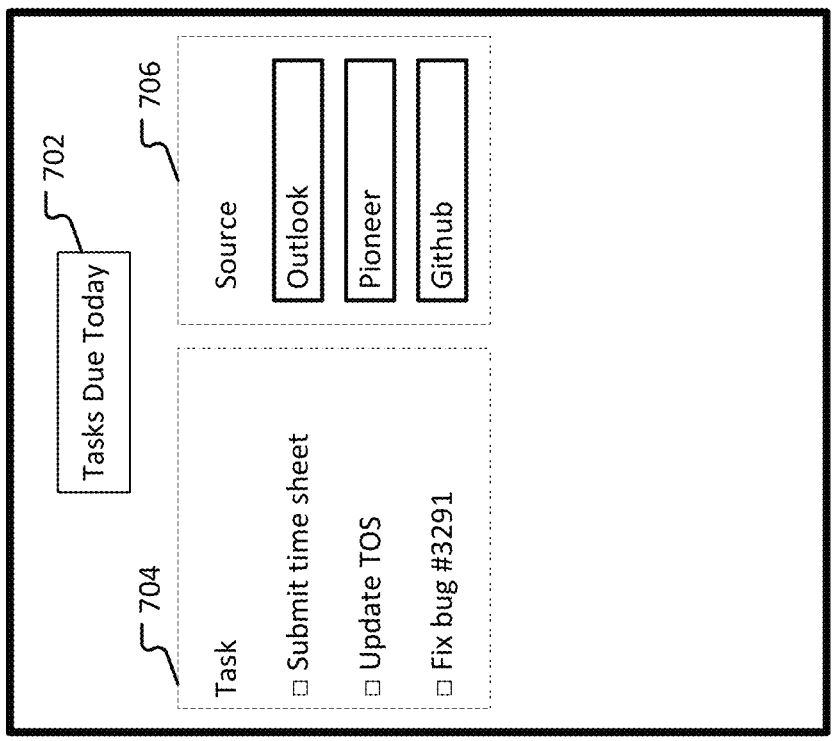
FIGS. 7A-C illustrate an example interface for presenting a view of tasks aggregated from disparate data sources as described herein.
Figure 7A:
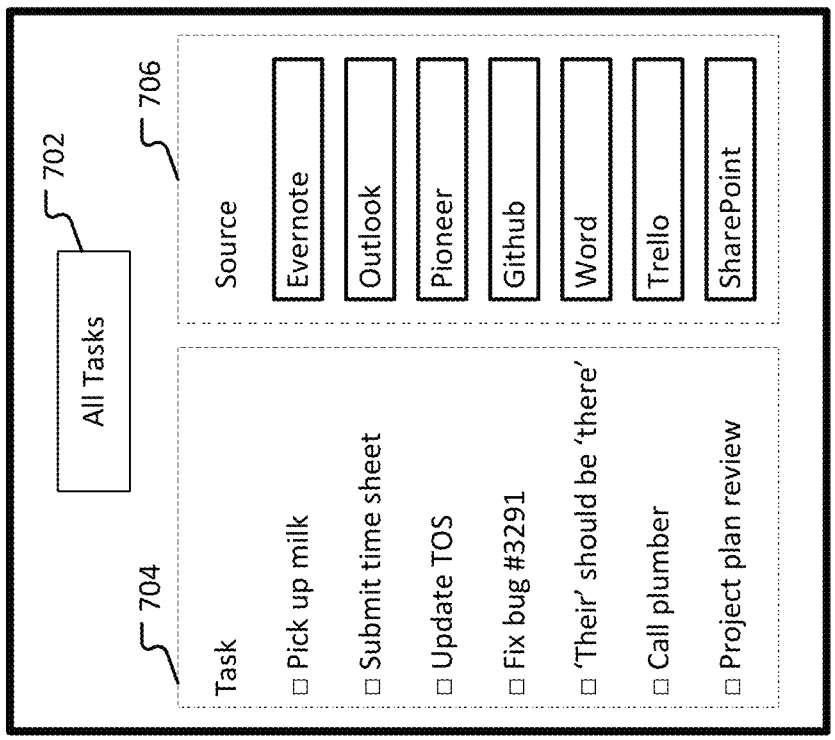
Figure 7C:
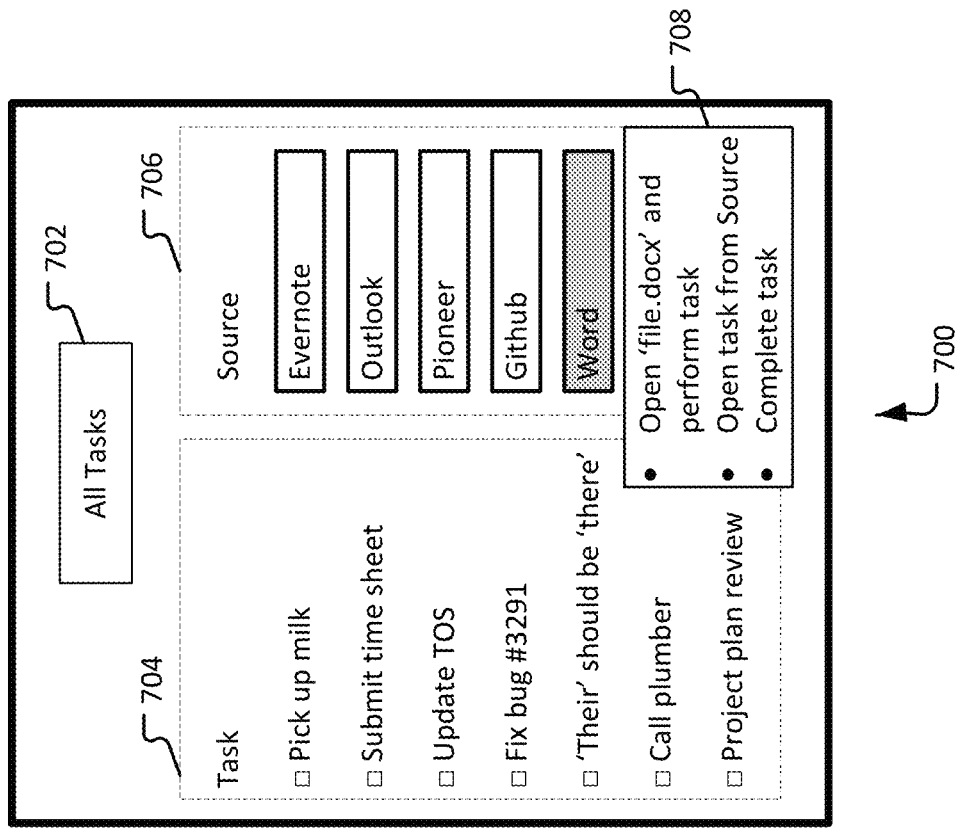

FIGS. 7A-C illustrate an example interface 700 for presenting a view of tasks aggregated from disparate data sources. In aspects, the tasks presented in interface 700 may represent the tasks generated and task management techniques implemented in FIGS. 4-6. With respect to FIG. 7A, interface 700 may be operable to present a set of tasks (and corresponding data) collected using one or more isolated collections of data. Interface 700 may comprise a view identifier 702, task list 704 and source list 706. In examples, interface 700 may receive a set of tasks comprising tasks and/or task data from various data sources, such as task stores, user accounts/sub-accounts, application/service data, etc. Interface 700 may display the tasks according to the view identifier 702. View identifier 702 may comprise or represent a label or category indicative of a current task view from the set of tasks. As illustrated in FIG. 7A, view identifier 702 may display the label "All Tasks" to indicate that a set of tasks being presented by interface 700 comprises at least a portion of the entire task list in the set of tasks. In an alternate example, the view identifier 702 may display a subset of the set of tasks according to one or more criteria. The criteria may provide for organizing tasks according to task data source, user account, user sub-account, task creation date, task due date, task priority, task type, source, source type, or the like. For example, as illustrated in FIG. 7B, view identifier 702 may display the label "Tasks Due Today" to indicate that only those tasks in the set of tasks having a due date of "today" are being displayed. Task list 704 may list some portion of the set of tasks for the current task view. As an example, FIG. 7A lists tasks, such as "Pick up milk," "Submit time sheet," "Update TOS" and "Fix bug #3291." Source list 706 may list some portion of the list of data sources corresponding to the set of tasks. For example, FIG. 7A lists "Evernote" as the corresponding data source for the "Pick up milk" task, "Outlook" as the corresponding data source for the "Submit time sheet" task, "Pioneer" as the corresponding data source for the "Update TOS" task, and "Github" as the corresponding data source for the "Fix bug #3291" task.

Interface 700 may further be operable to rank tasks in the presented set of tasks. In aspects, interface 700 may comprise or have access to a logic component, such as logic engine 506. The logic component may be operable to access and analyze a set of tasks and corresponding task data. In examples, this analysis may comprise determining task dependencies, associations between tasks, task owners/creators, task statuses and dates, etc. Based on the analysis, interface 700 may assign a score and/or weight to one or more tasks. The score weight may indicate a priority of a task in the set of tasks with respect to other tasks or events based on, e.g., the determined task dependencies, associations between tasks, task owners/creators, task statuses and dates, etc. For example, with respect to FIG. 7A, the logic component may determine that the "Pick up milk" and "Submit time sheet" have due dates of "past due," the "Fix bug #3291" task has a due date of "today," the "Update TOS" and "'Their' should be 'there'" tasks have a due date of "tomorrow," and the remaining tasks (e.g., "Call plumber" and "Project plan review") have due dates of more than five (5) days in the future. Accordingly, the "Pick up milk" and "Submit time sheet" tasks may be assigned a score of 1.5, the "Fix bug #3291" task may be assigned a preliminary score of 1.0, the "Update TOS" and "'Their' should be 'there'" tasks may be assigned a preliminary score of 0.75, and the remaining tasks may be assigned a preliminary score of 0.25. Additionally, the logic component may determine that the creator/owner of the "Pick up milk" task is a user designated as "spouse," the creator/owner of the "Fix bug #3291" task is a user designated as "manager," and the creator/owner of the remaining tasks is the user (e.g., the user interacting with interface 700). The tasks may then be additionally weighted in importance according to such determined task creator/owner. Accordingly, the "Pick up milk" task may receive a weight or multiplier of 3.0 and the "Fix bug #3291" task may receive a weight or multiplier of 2.0. The logic device or interface 700 may then provide the preliminary scores and/or weights to one or more scoring algorithms to determine one or more final scores. In a particular example, a scoring algorithm may multiply the preliminary scores and weights such that the following final scores are assigned: "Pickup milk"=4.5 (1.5*3.0), "Submit time sheet"=1.5, "Update TOS"=0.75, "Fix bug #3291"=2.0 (1.0*2.0), "'Their' should be 'there'"=0.75, "Call plumber"=0.25, "Project plan review"=0.25. In aspects, interface 700 may then rank, sort and/or present tasks according to the final scores. In a particular aspect, interface 700 may additionally display (or make available) the preliminary scores, weights, final scores and/or other ranking logic such that the relative importance of the each task may be implied or otherwise determined.

Interface 700 may further be operable to perform actions on the presented set of tasks. In aspects, interface 700 may provide for navigating and/or interacting with the presented set of tasks and/or sources. For example, a user may select a task and/or a source presented by interface 700. As a result of the selection, a set of actions enabling interaction with selected item may be presented. As an example, FIG. 7C illustrates that actions list 708 is displayed in response to the selection of the "Word" data source corresponding to the "'Their' should be 'there'" task. Actions list 708 comprises the actions "Open 'file.docx' and perform task," "Open task from source" and "Complete task." In aspects, selecting one or more actions from actions list 708 may enable interface 700 to perform (or cause the performance of) the selected action. Upon selection of an action from actions list 708, interface 700 may cause the execution of the selected action without opening the application/service that originated the task. For instance, upon receiving the "Complete task" action in FIG. 7C, interface 700 may cause a task management application, such as task management application 402, to transmit a completion notification to the "Word" word processing application or a service in communication with the "Word" application. In examples, such a completion notification may be transmitted via a webhook, a POST command, or the like. The completion notification may be used to remove or otherwise resolve the task corresponding to the selected action (e.g., the "'Their' should be 'there'" task). Removing/resolving the task may comprise deleting the task or an indication of the task from a data store, providing an indication that the task has been completed, initiating a separate task that is dependent on the removed/resolved task, causing an application/service other than the application/service that originated the task to perform the task, causing the application/service that originated the task to perform the task without initiating core functionality of the application/service, etc. In aspects, interface 700 may receive a resolution indication from an application/service when a task has been resolved. Interface 700 may display the resolution indication or may generate and display an indication representing the resolution. For example, with respect to FIGS. 7A-C, the checkbox next to the task be checked, the task may be removed from the set of tasks, the task may be grayed out, struck through, moved to a "Completed Tasks" view, etc.

Figure 8:
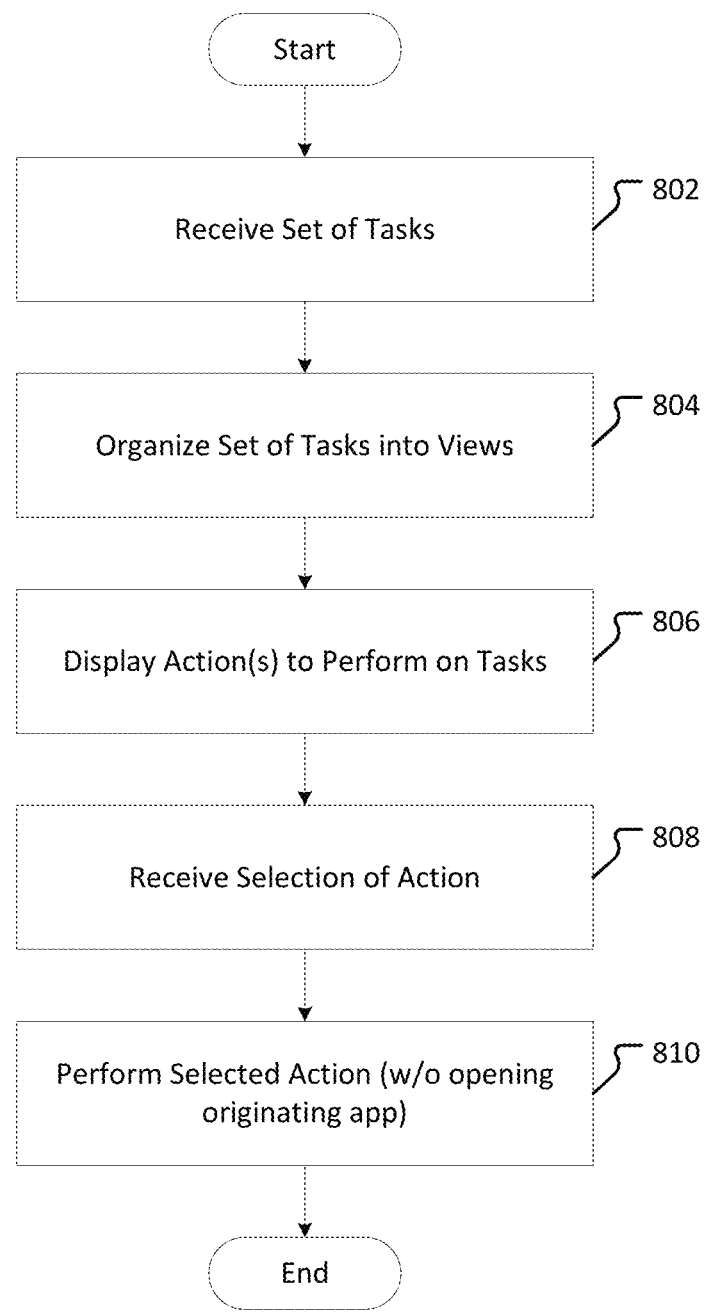
FIG. 8 illustrates an example method of managing user tasks using an isolated collection of data as described herein.

FIG. 8 illustrates an example method 800 of presenting a view of tasks aggregated from disparate data sources. Example method 800 begins at operation 802 where a set of tasks may be received. In aspects, an interface, such as interface 700, may receive or access a set of tasks collected using one or more sets of isolated data. As discussed above, the set of tasks may be collected from various profiles, accounts, application/services, task stores, etc. Additionally, tasks may be entered and/or modified using the interface.

At operation 804, a set of tasks may be organized into one or more views. In aspects, a received set of tasks may be evaluated to determine task data and information associated with the tasks in the set of tasks. Evaluating the tasks may comprise parsing the set of tasks to identify one or more categories, such as task type, originating application/service, data source, task owner, task due dates, status, etc. The evaluated task data may be organized according to the identified categories. For example, a master view of tasks comprising each task in a set of tasks may be generated for a set of tasks. One or more faceted views comprising a subset of tasks in the master view may also be generated. The faceted views may correspond to categories identified by evaluating the task data. As a particular example, a first faceted view may comprise tasks in the set of tasks having a due date of "today," and a second faceted view may comprise tasks in the set of tasks generated by a specific user account (e.g., a "work" account, or "home" account, etc.). In some aspects, the tasks of one or more views may be ranked to indicate task priority or importance. For example, tasks in a set of tasks may be assigned scores and/or weights based on an evaluation of the set of tasks. The scores and/or weights may be generated using one or more scoring models or algorithms. The scored tasks may then be ranked and/or organized within the corresponding views to indicate task importance and task priority. In examples, the views may additionally comprise the scores, weights, an indication of task importance/priority and/or other ranking logic. In at least one aspect, the tasks of one or more views may be ranked and/or organized to indicate one or more task dependencies. For example, tasks in a set of tasks may be evaluated to determine dependencies or criteria for executing the tasks or portions/steps thereof. The dependencies/criteria may be illustrated in a corresponding view by, for example, presenting the task and dependencies as a numbered/alphabetical list, presenting the dependencies of a task as bullets to the task, inserting arrowed lines between tasks, presenting the criteria upon a selection or hover event of the task, etc. Those of ordinary skill in the art will appreciate that several methods of illustrating dependencies/criteria may be utilized in accordance with the techniques presented herein.

At operation 806, one or more task actions may be displayed. In aspects, one or more tasks in a view may be associated with one or more actions. The actions may enable an interaction with the corresponding tasks and task data, associated files and data sources, task-originating applications/services, APIs and services facilitating task completion, and the like. For example, as illustrated by actions list 708 of FIG. 7C, the actions associated with a task for a document in a word processing application may include opening the document and preforming the task from the task view, opening the task from the word processing application, and marking the task as completing from the task view. In some aspects, the list of available task actions may be collected from one or more application, services and/or APIs. For example, the interface displaying the task views may be operable to determine the applications/services available to the interface. In such an example, determining the applications/services available to the interface may include accessing a manifest comprising known resources (e.g., applications, services, etc.) and/or polling resources and/or network devices. After determining the applications/services available to the interface, a list of applications/services capable of performing the listed actions may be determined. As an example, applications capable of opening and/or modifying a word processing document may be identified. One or more actions that are capable of being performed by the identified application(s) (e.g., open document, add table, modify content, etc.) may be identified and displayed in the task view of the interface upon selection of, or interaction with, the corresponding task.

At operation 808, a selected action may be received. In aspects, an action from a list of available actions may be selected for a task in a task view. The selection may be processed by the interface comprising the task view. In examples, processing the selection may include determining whether the user is authorized to perform the selected action, identifying an application/service to perform the selected action, evaluating associated and/or dependent tasks, etc. At operation 810, a selected action may be performed. In aspects, the interface in which a task view is displayed may perform, or cause the performance of, the selected action. In at least one such aspect, the interface may be operable to perform the selected action without opening the application/service that originated the corresponding task (e.g., the "originating application/service"). For example, the interface may comprise or have access to one or more APIs or functions for performing the selected action and/or one or more aspects of the task. The APIs or functions may comprise functionality that is similar to (or the same as) functionality of the originating application/service. As a result, the interface may execute the APIs/functions and perform the selected action without opening the originating application/service. In another such aspect, the interface may be operable to perform the selected action without initiating the core functionality of the originating application/service. For example, the interface may generate a set of instructions related to performing a selected action. The set of instructions may be transmitted to, for instance, a listener or an API of the originating application/service. The listener/API may be able to execute the set of instructions without opening the main interface of the originating application/service. As a specific example, a listener/API of the originating application/service may receive an instruction related to a "Review Document" task. The instruction may correspond to the selected action "Delete Document." As a result, the listener/API may remove data associated with the document from a corresponding application database or file system. In such an example, the originating application/service does not need to be open to remove or modify the data. In aspects, the interface may receive or generate an event notification representing the status of the selected action. The interface may display the event notification within the task view of the corresponding task. The interface may additionally facilitate the removal/resolution of the task from the interface and/or the originating application/service.

FIGS. 9-12 and the associated descriptions provide a discussion of a variety of operating environments in which aspects of the disclosure may be practiced. However, the devices and systems illustrated and discussed with respect to FIGS. 9-12 are for purposes of example and illustration and are not limiting of a vast number of computing device configurations that may be utilized for practicing aspects of the disclosure, described herein.

Figure 9:
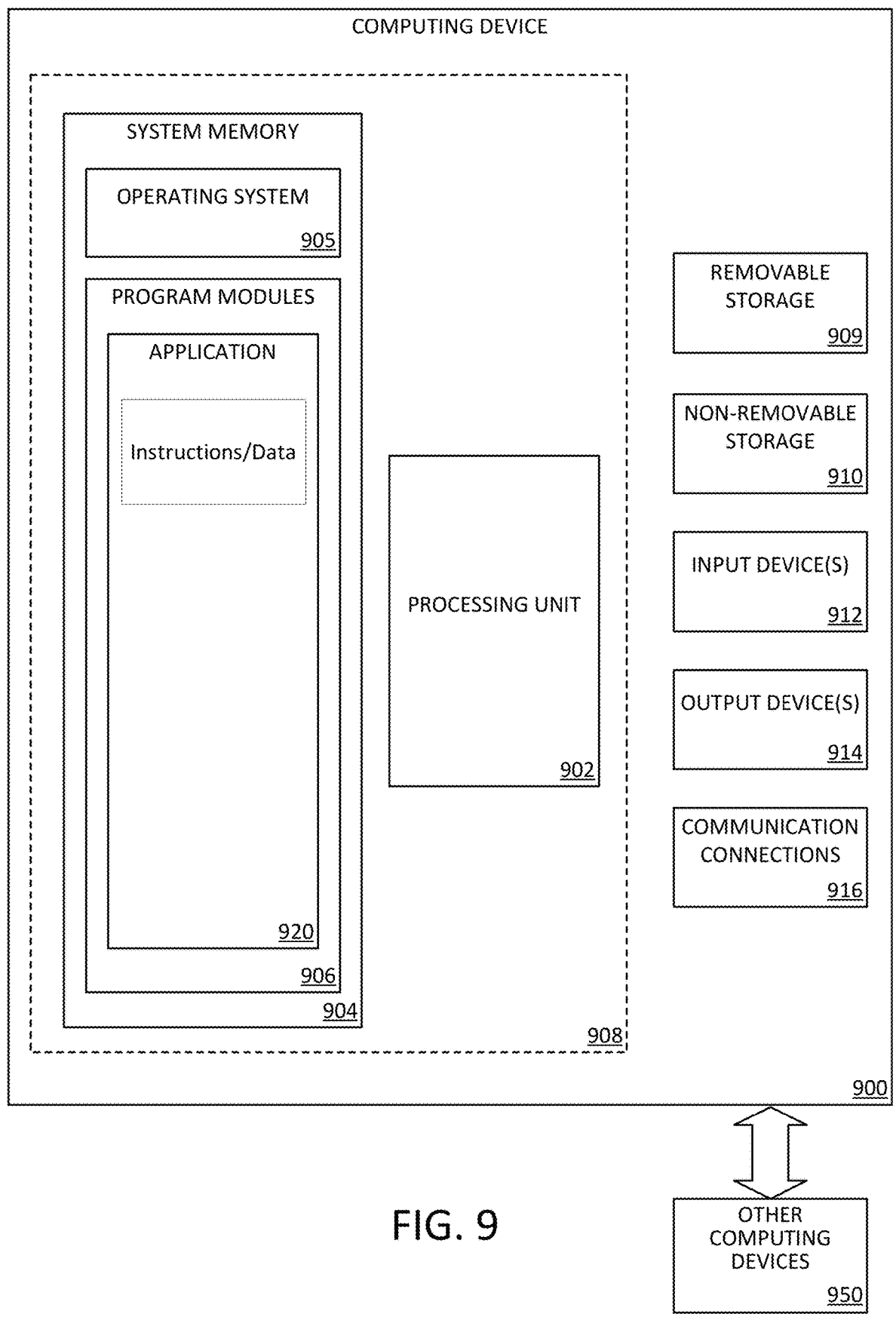
FIG. 9 is a block diagram illustrating example physical components of a computing device with which aspects of the disclosure may be practiced.

FIG. 9 is a block diagram illustrating physical components (e.g., hardware) of a computing device 900 with which aspects of the disclosure may be practiced. The computing device components described below may be suitable for the computing devices described above, including the client computing devices 102A-C and the server computing devices 106A-C. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 and one or more program modules 906 suitable for running software application 920, such as one or more components supported by the systems described herein. As an example, system memory 904 may store isolated collection data (e.g., resource identifiers, resource metadata, relationship information, asserted/inferred relationships, graphical mapping information, query data, rule sets, such as, for example, inference rules, authorization information, authentication information, etc.) and instructions for managing and presenting tasks associated with the isolated collection data. The operating system 905, for example, may be suitable for controlling the operation of the computing device 900. Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., application 920) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
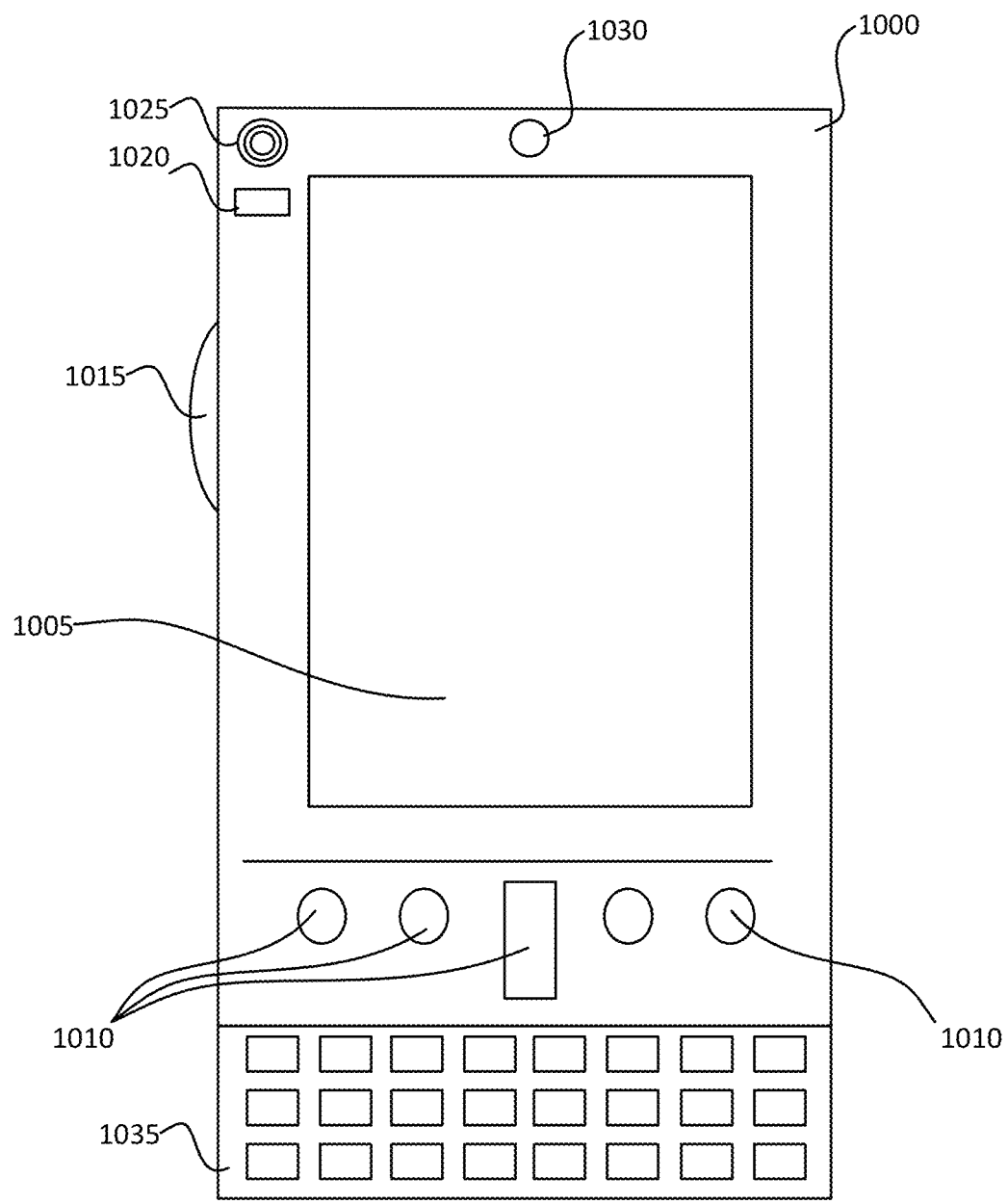
FIGS. 10A and 10B are simplified block diagrams of a mobile computing device with which aspects of the present disclosure may be practiced.
Figure 10B:
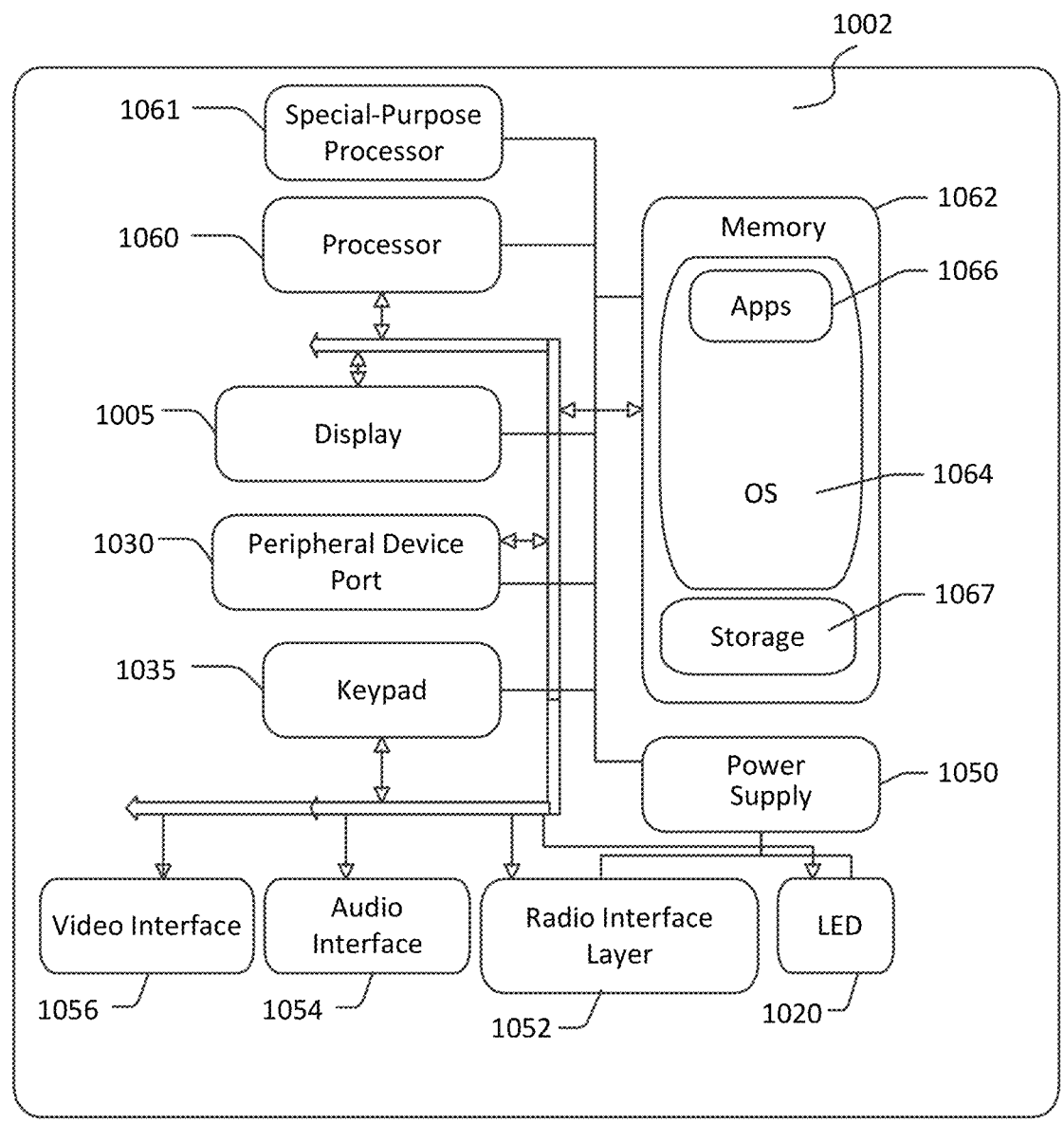

FIGS. 10A and 10B illustrate a mobile computing device 1000, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 10A, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1067 within the memory 1062. The non-volatile storage area 1067 may be used to store persistent information that should not be lost if the system 1002 is powered down. The application programs 1066 may use and store information in the non-volatile storage area 1067, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1067 synchronized with corresponding information stored at the host computer. As should be appreciated, other applications may be loaded into the memory 1062 and run on the mobile computing device 1000 described herein (e.g., search engine, extractor module, relevancy ranking module, answer scoring module, etc.).

The system 1002 has a power supply 1050, which may be implemented as one or more batteries. The power supply 1050 might further include an external power source, such as an AC adapter or a powered docking cradle that supplements or recharges the batteries.

The system 1002 may also include a radio interface layer 1052 that performs the function of transmitting and receiving radio frequency communications. The radio interface layer 1052 facilitates wireless connectivity between the system 1002 and the "outside world," via a communications carrier or service provider. Transmissions to and from the radio interface layer 1052 are conducted under control of the operating system 1064. In other words, communications received by the radio interface layer 1052 may be disseminated to the application programs 1066 via the operating system 1064, and vice versa.

The visual indicator 1020 may be used to provide visual notifications, and/or an audio interface 1054 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1050 so that when activated, they remain on for a duration dictated by the notification mechanism even though the processor(s) (e.g., processor 1060 and/or special-purpose processor 1061) and other components might shut down for conserving battery power. The LED may be programmed to remain on indefinitely until the user takes action to indicate the powered-on status of the device. The audio interface 1054 is used to provide audible signals to and receive audible signals from the user. For example, in addition to being coupled to the audio transducer 1025, the audio interface 1054 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1056 that enables an operation of an on-board camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1067.

Data/information generated or captured by the mobile computing device 1000 and stored via the system 1002 may be stored locally on the mobile computing device 1000, as described above, or the data may be stored on any number of storage media that may be accessed by the device via the radio interface layer 1052 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1052 or via a distributed computing network. Similarly, such data/information may be readily transferred between computing devices for storage and use according to well-known data/information transfer and storage means, including electronic mail and collaborative data/information sharing systems.

Figure 11:
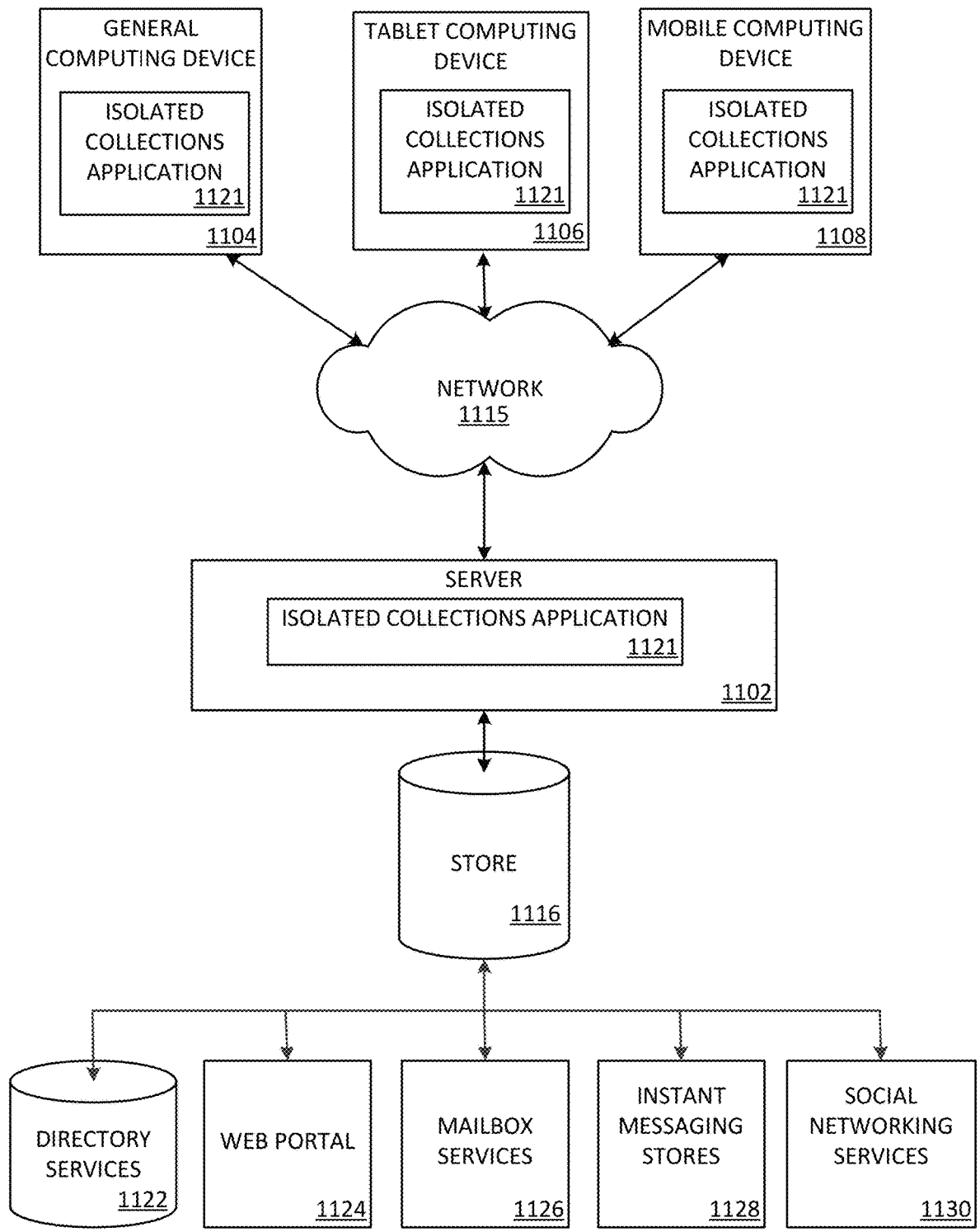
FIG. 11 is a simplified block diagram of a distributed computing system in which aspects of the present disclosure may be practiced.

FIG. 11 illustrates one aspect of the architecture of a system for processing data received at a computing system from a remote source, such as a personal computer 1104, tablet computing device 1106, or mobile computing device 1108, as described above. Content displayed at server device 1102 may be stored in different communication channels or other storage types. For example, various documents may be stored using a directory service 1122, a web portal 1124, a mailbox service 1126, an instant messaging store 1128, or a social networking site 1130. An task management application 1121 may be employed by a client that communicates with server device 1102, and/or the isolated collections application 1121 may be employed by server device 1102. The server device 1102 may provide data to and from a client computing device such as a personal computer 1104, a tablet computing device 1106 and/or a mobile computing device 1108 (e.g., a smart phone) through a network 1115. By way of example, the computer system described above may be embodied in a personal computer 1104, a tablet computing device 1106 and/or a mobile computing device 1108 (e.g., a smart phone). Any of these embodiments of the computing devices may obtain content from the store 1116, in addition to receiving graphical data useable to be either pre-processed at a graphic-originating system, or post-processed at a receiving computing system.

Figure 12:
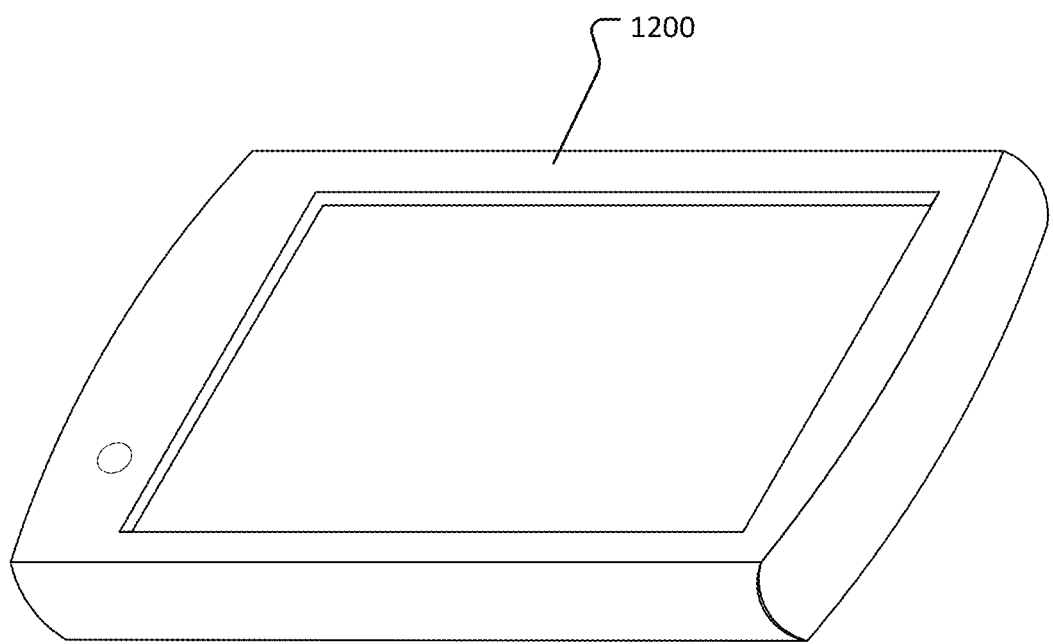
FIG. 12 illustrates a tablet computing device for executing one or more aspects of the present disclosure.

FIG. 12 illustrates an exemplary tablet computing device 1200 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure provide a system comprising: at least one processor; and memory coupled to the at least one processor, the memory comprising computer executable instructions that, when executed by the at least one processor, performs a method for managing user tasks, the method comprising: receiving a request for task data associated with a user; using one or more isolated collections to identify one or more tasks associated with the task data; aggregating the one or more identified tasks; analyzing the aggregated tasks to generate one or more determinations relating to the aggregated tasks; using the one or more determinations to generate a result to the request; and causing the result to be displayed on a user interface accessible to the system. In some examples, the one or more tasks correspond to at least one of events, actions and sequences of actions contributing to completing an objective. In some examples, identifying the one or more tasks comprises: generating one or more queries using data in the request; and using the one or more queries to search the one or more isolated collections. In some examples, generating one or more queries comprises: identifying one or more keywords in the request data; and using the one or more identified keywords to generate the one or more queries. In other examples, generating one or more queries comprises: using the request data to identify one or more contexts for the user; identifying data sources associated with the one or more contexts; and generating the one or more queries according to a format associated with one or more of the data sources. In other examples, the one or more isolated collections comprise at least one of a task and a task pointer associated with the user, wherein the task pointer corresponds to a remote data store of tasks. In other examples, aggregating the identified tasks includes standardizing the identified tasks, wherein the standardizing comprises at least one of: assigning types to the identified tasks, modifying types of the identified tasks, generating one or more generic task types, adding one or more elements to the identified tasks, and modifying task descriptions of the identified tasks. In other examples, analyzing the identified tasks comprises determining at least one of: associations between the one or more tasks, associations between the one or more tasks and one or more users, task dependencies, task classifications, task priority levels, task statuses, task optimizations and resource allocations. In other examples, generating a result to the request comprises creating at least one of a set of commands and a set of instructions to be executed based on a set of criteria. In other examples, generating the one or more determinations relating to the aggregated tasks comprises determining a suggested order of task completion based on one or more task priority levels.

Aspects of the present disclosure further provide a method for managing user tasks, the method comprising: receiving a request for task data associated with a user; using one or more isolated collections to identify one or more tasks associated with the task data; aggregating the one or more identified tasks; analyzing the aggregated tasks to generate one or more determinations relating to the aggregated tasks; using the one or more determinations to generate a result to the request; and causing the result to be displayed on a user interface accessible to the system. In some examples, the one or more tasks correspond to at least one of events, actions and sequences of actions contributing to completing an objective. In some examples, identifying the one or more tasks comprises: generating one or more queries using data in the request; and using the one or more queries to search the one or more isolated collections for at least one of tasks and pointers to task stores. In some examples, aggregating the identified tasks includes standardizing the identified tasks, wherein the standardizing comprises at least one of: assigning types to the identified tasks, modifying types of the identified tasks, generating one or more generic task types, adding one or more elements to the identified tasks, and modifying task descriptions of the identified tasks. In some examples, analyzing the identified tasks comprises determining at least one of: associations between the one or more tasks, associations between the one or more tasks and one or more users, task dependencies, task classifications, task priority levels, task statuses, task optimizations and resource allocations. In some examples, generating a result to the request comprises creating at least one of a set of commands and a set of instructions to be executed based on a set of criteria.

Aspects of the present disclosure further provide a hardware device storing computer executable instructions that when executed cause a computing system to perform a method of managing user tasks, the method comprising: receiving a request for task data associated with a user; identifying one or more tasks using one or more isolated collections; aggregating the identified tasks; analyzing the identified tasks to generate one or more determinations relating to the identified tasks; using the one or more determinations to generate a result to the request; and causing the result to be displayed on a user interface accessible to the hardware device. In some examples, the one or more isolated collections comprise one or more asserted resources and relationships between the resources. In some examples, identifying the one or more tasks comprises: generating one or more queries using data in the request; and using the one or more queries to search the one or more isolated collections for at least one of tasks and pointers to task stores. In some examples, analyzing the identified tasks comprises determining at least one of: associations between the one or more tasks, associations between the one or more tasks and one or more users, task dependencies, task classifications, task priority levels, task statuses, task optimizations and resource allocations.

Aspects of the present disclosure further provide a system comprising: at least one processor; and memory coupled to the at least one processor, the memory comprising computer executable instructions that, when executed by the at least one processor, performs a method for presenting a view of tasks, the method comprising: receiving a set of tasks from one or more isolated collections, wherein the set of tasks comprise tasks from a plurality of sources; organizing the set of tasks into one or more views; displaying, in the one or more views, one or more actions associated with the set of tasks; receiving a selection of an action in the one or more actions, wherein the selected action corresponds to a task in the set of tasks; and causing the selected action to be performed without opening the application that originated the task. In some examples, the plurality of sources corresponds to at least a first user account for a user and comprises at least one of a task store, a user accounts, a user sub-account, application data and service data. In some examples, organizing the set of tasks comprises parsing the set of tasks to identify one or more categories, and correlating at least one of the one or more categories with a view in the one or more views. In some examples, organizing the set of tasks further comprises: receiving a selection of a task in the set of tasks; and identifying at least one action associated with the selected task, wherein identifying the at least one action comprises at least one of accessing a manifest comprising known resources and polling resources. In other examples, organizing the set of tasks further comprises: determining scores for tasks in the set of tasks; and sorting the tasks according to the scores, wherein the scores are indicative of a priority of completion. In some examples, the determining the scores comprises: evaluating the tasks to determine information selected from the group consisting of task dependencies, associations between tasks, task owners/creators, task statuses and task dates; assigning preliminary scores to the determined information; and applying the preliminary scores to at least one of a scoring model and a scoring algorithm to generate final scores. In some examples, the one or more views comprises a master view and one or more faceted views, the master view comprising each task in the set of tasks, and the one or more faceted views comprising a subset of the tasks in the set of tasks. In some examples, the one or more actions enable interaction with at least one of: corresponding tasks and task data, associated files and data sources, task-originating applications/services, and applications/services facilitating task completion. In some examples, receiving the selection of an action comprises at least one of: determining whether a user is authorized to perform the selected action, identifying an application/service to perform the selected action, and evaluating one or more tasks associated with the task. In some examples, causing the selected action to be performed comprises executing the selected action from the one or more views. In some examples, causing the selected action to be performed comprises executing the selected action using at least one of an API and a function comprising functionality similar to functionality of an application originating the task.

Aspects of the present disclosure further provide a method comprising: receiving a set of tasks from one or more isolated collections, wherein the set of tasks comprise tasks from a plurality of sources; organizing the set of tasks into one or more views; displaying, in the one or more views, one or more actions associated with the set of tasks; receiving a selection of an action in the one or more actions, wherein the selected action corresponds to a task in the set of tasks; and causing the selected action to be performed without opening the application that originated the task. In some examples, the plurality of sources corresponds to at least a first user account for a user and comprises at least one of a task store, a user account, a user sub-account, application data and service data. In other examples, organizing the set of tasks further comprises: determining scores for tasks in the set of tasks; and sorting the tasks according to the scores, wherein the scores are indicative of a priority of completion. In some examples, the determining the scores comprises: evaluating the tasks to determine information selected from the group consisting of task dependencies, associations between tasks, task owners/creators, task statuses and task dates; assigning preliminary scores to the determined information; and applying the preliminary scores to at least one of a scoring model and a scoring algorithm to generate final scores. In some examples, the one or more views comprises a master view and one or more faceted views, the master view comprising each task in the set of tasks, and the one or more faceted views comprising a subset of the tasks in the set of tasks. In some examples, the master view and the one or more faceted views are operable to receive one or more selected actions. In some examples, the method further comprises receiving an indication of the status of the selected action; updating the corresponding task; and displaying, in the one or more views, the updated corresponding task.

Aspects of the present disclosure further provide a hardware device storing computer executable instructions that when executed cause a computing system to perform a method of presenting a view of tasks aggregated from disparate data sources, the method comprising: receiving, a set of tasks from one or more isolated collections, wherein the set of tasks comprise tasks from a plurality of sources; organizing the set of tasks into one or more views; displaying the one or more views on an interface of the hardware device; receiving a selection of a task in the one or more views; and causing the selected task to be resolved without initiating core functionality of the application originating the task.

Aspects of the present disclosure are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory coupled to the at least one processor, the memory comprising computer executable instructions that, when executed by the at least one processor, performs operations for presenting a view of tasks, comprising:
   generating an isolated collection based on discovering relationships between a plurality of resources associated with a plurality of software applications, wherein at least one of the discovered relationships is a first task relationship;
   in response to receiving a query via a task management interface, traversing the isolated collection to identify at least the first task relationship between two or more resources of the plurality of resources within the isolated collection;
   based at least on the first task relationship, identifying a set of tasks related to the query using one or more APIs associated with a first software application of the plurality of software applications, wherein a first task of the set of tasks is identified based on the first task relationship with a first resource associated with the first software application of the plurality of software applications;
   causing, in a first view of a graphical user interface (GUI) of the task management interface, display of the set of tasks;
   causing, in a second view of the GUI, display of a subset of the set of tasks based on applying at least one criteria, wherein an organization of the subset in the second view is indicative of task priority, and wherein the subset comprises at least the first task of the set of tasks and at least a first action associated with the first task;
   receiving, via a control element of the GUI, a selection of the first action associated with the first task of the set of tasks;
   in response to the selection, causing completion of the selected first action via interaction with the first resource of the first software application through the task management interface; and
   recording, using the one or more APIs, the completion of the first action in the first software application, without opening the first software application in an interface.

2. The system of claim 1, wherein the first resource corresponds to at least a first user account and comprises at least one of a task store, a user sub-account, application data or service data.

3. The system of claim 1, the computer executable instructions when executed by the at least one processor further performing:
   organizing the set of tasks in the first view of the GUI of the task management interface, wherein organizing the set of tasks comprises parsing the set of tasks to identify one or more categories, and correlating at least one of the one or more categories with the first view.

4. The system of claim 3, wherein organizing the set of tasks further comprises:
   receiving a selection of a second task of the set of tasks; and
   identifying at least one second action associated with the selected second task, wherein identifying the at least one second action comprises at least one of polling resources for supported actions or accessing a manifest comprising known resources.

5. The system of claim 3, wherein organizing the set of tasks further comprises:
   determining scores for each task of the set of tasks; and
   sorting the tasks according to the scores, wherein the scores are indicative of the task priority of completion for each task.

6. The system of claim 5, wherein determining the scores comprises:
   evaluating the tasks to determine information associated with one or more of task dependencies, associations between tasks, task owners/creators, task statuses and task dates;
   assigning preliminary scores to each task based on the determined information; and
   applying the preliminary scores to at least one of a scoring model or a scoring algorithm to generate final scores for each task.

7. The system of claim 3, wherein the first view is a master view comprising each task of the set of tasks, and wherein the second view is a faceted view comprising the subset of the set of tasks.

8. The system of claim 1, wherein the task management interface enables completion of one or more actions based on interaction with at least one of: corresponding tasks and task data, associated files and data sources, task-originating applications/services, or applications/services facilitating task completion.

9. The system of claim 1, wherein in response to receiving the selection of the first action, the operations performed by the system further comprise at least one of: determining whether a user is authorized to perform the selected first action, identifying an application/service to perform the selected first action, or evaluating one or more tasks associated with the first task.

10. The system of claim 3, wherein enabling the selected first action to be completed comprises executing the selected first action from the second view of the task management interface.

11. The system of claim 1, wherein enabling the selected first action to be completed comprises executing the selected first action using a function comprising functionality similar to functionality of the first software application originating the first task.

12. The system of claim 3, the operations performed by the system further comprising:
   receiving an indication of the status of the selected first action;
   updating the corresponding first task; and
   displaying, in the second view, the updated corresponding first task.

13. A method for presenting a view of tasks, the method comprising:
   generating an isolated collection based on discovering relationships between a plurality of resources associated with a plurality of software applications, wherein at least one of the discovered relationships is a first task relationship;
   in response to receiving a query, via a graphical user interface of a computing device, traversing the isolated collection to identify at least the first task relationship between two or more resources of the plurality of resources within the isolated collection;
   based at least on the first task relationship, identifying a set of tasks related to the query using one or more APIs associated with a first software application of the plurality of software applications, wherein a first task of the set of tasks is identified based on the first task relationship with a first resource associated with the first software application of the plurality of software applications;

causing display, in a first view of the graphical user interface, of the set of tasks;

causing, in a second view of the graphical user interface, display of a subset of the set of tasks based on applying at least one criteria, wherein an organization of the subset in the second view is indicative of task priority, and wherein the subset comprises at least the first task of the set of tasks and at least a first action associated with the first task;

receiving, via a control element of the graphical user interface, a selection of the first action associated with the first task of the set of tasks;

in response to the selection, causing completion of the selected first action via interaction with the first resource of the first software application through the graphical user interface; and recording, using the one or more APIs, the completion of the first action in the first software application, without opening the first software application in an interface.

14. The method of claim 13, wherein the first resource corresponds to at least a first user account and comprises at least one of a task store, a user sub-account, application data or service data.

15. The method of claim 13, further comprising:
organizing the set of tasks in the first view of the graphical user interface by:
determining scores for each task of the set of tasks; and
sorting the tasks according to the scores, wherein the scores are indicative of the task priority of completion for each task.

16. The method of claim 15, wherein determining the scores comprises:
evaluating the tasks to determine information associated with one or more of task dependencies, associations between tasks, task owners/creators, task statuses and task dates;
assigning preliminary scores to each task based on the determined information; and
applying the preliminary scores to at least one of a scoring model or a scoring algorithm to generate final scores for each task.

17. The method of claim 15, wherein the first view is a master view comprising each task of the set of tasks, and wherein the second view is a faceted view comprising the subset of the set of tasks.

18. The method of claim 17, wherein the master view and the faceted view are operable to receive one or more selected actions.

19. The method of claim 15, further comprising:
receiving an indication of the status of the selected first action;
updating the corresponding first task; and
displaying, in the second view, the updated corresponding first task.

20. A hardware device storing computer executable instructions that when executed by a processor cause a computing system to perform operations for presenting a view of tasks aggregated from disparate data sources, comprising:

generating an isolated collection based on discovering relationships between a plurality of resources associated with a plurality of software applications, wherein at least one of the discovered relationships is a first task relationship;

in response to receiving to receiving a query via a task management interface, traversing the isolated collection to identify at least the first task relationship between two or more resources of the plurality of resources within the isolated collection;

based at least on the first task relationship, identifying a set of tasks related to the query using one or more APIs associated with a first software application of the plurality of software applications, wherein a first task of the set of tasks is identified based on the first task relationship with a first resource associated with the first software application of the plurality of software applications;

causing, in a first view of a graphical user interface (GUI) of the task management interface, display of the set of tasks;

causing, in a second view of the GUI, display of a subset of the set of tasks based on applying at least one criteria, wherein an organization of the subset in the second view is indicative of task priority, and wherein the subset comprises at least the first task of the set of tasks and at least a first action associated with the first task;

receiving, via a control element of the GUI, a selection of the first task of the set of tasks;

identifying at least a first action associated with the selected first task;

causing completion of the identified first action of the selected first task via interaction with the first resource of the first software application through the task management interface; and recording, using the one or more APIs, the completion of the first action in the first software application, without opening the first software application in an interface.

* * * * *